US008447701B2

(12) United States Patent
Nicks

(10) Patent No.: US 8,447,701 B2
(45) Date of Patent: *May 21, 2013

(54) APPRAISING DOMAIN NAMES USING COMPARATIVE DATA

(75) Inventor: Paul Nicks, Marion, IA (US)

(73) Assignee: Go Daddy Operating Company, LLC, Scottsdale, AZ (US)

( * ) Notice: Subject to any disclaimer, the term of this patent is extended or adjusted under 35 U.S.C. 154(b) by 382 days.

This patent is subject to a terminal disclaimer.

(21) Appl. No.: 12/708,793

(22) Filed: Feb. 19, 2010

(65) Prior Publication Data

US 2011/0208720 A1 Aug. 25, 2011

(51) Int. Cl.
*G06Q 30/00* (2012.01)
*G06F 17/00* (2006.01)

(52) U.S. Cl.
USPC ............................ 705/306; 707/769; 707/944

(58) Field of Classification Search
USPC ................... 707/728, E17.017, 944; 705/306
See application file for complete search history.

(56) References Cited

U.S. PATENT DOCUMENTS

| | | | | |
|---|---|---|---|---|
| 6,298,341 | B1 | 10/2001 | Mann et al. | |
| 6,332,158 | B1 | 12/2001 | Risley et al. | |
| 6,519,589 | B2 | 2/2003 | Mann et al. | |
| 6,560,634 | B1 | 5/2003 | Broadhurst | |
| 6,687,746 | B1 | 2/2004 | Shuster et al. | |
| 6,745,248 | B1 | 6/2004 | Gardos et al. | |
| 6,895,430 | B1 | 5/2005 | Schneider | |
| 6,901,436 | B1 | 5/2005 | Schneider | |
| 7,188,138 | B1 | 3/2007 | Schneider | |
| 7,664,831 | B2 | 2/2010 | Cartmell et al. | |
| 2002/0065903 | A1 | 5/2002 | Fellman | |
| 2002/0091703 | A1 | 7/2002 | Bayles | |
| 2002/0091827 | A1 | 7/2002 | King et al. | |
| 2004/0199493 | A1 | 10/2004 | Ruiz et al. | |
| 2004/0199520 | A1 | 10/2004 | Ruiz et al. | |
| 2005/0172031 | A1 | 8/2005 | Adelman | |
| 2006/0161682 | A1 | 7/2006 | King et al. | |
| 2006/0271668 | A1 | 11/2006 | Parsons et al. | |
| 2007/0083652 | A1 | 4/2007 | King et al. | |
| 2007/0299815 | A1 | 12/2007 | Starbuck et al. | |
| 2008/0059348 | A1* | 3/2008 | Glassman et al. | 705/35 |
| 2009/0248625 | A1 | 10/2009 | Adelman et al. | |
| 2009/0248734 | A1 | 10/2009 | Adelman et al. | |
| 2009/0248735 | A1 | 10/2009 | Adelman et al. | |
| 2009/0248736 | A1 | 10/2009 | Adelman et al. | |
| 2010/0058210 | A1* | 3/2010 | Johnson | 715/764 |
| 2010/0114879 | A1 | 5/2010 | Zhong et al. | |

OTHER PUBLICATIONS

Keywords—the Most Important Item in SEO, Mar. 23, 2007, pp. 1-4.*

Van Couvering, DomainsBot Investigation#2, Jan. 22, 2006, pp. 1-6.*

(Continued)

*Primary Examiner* — Albert Phillips, III

(74) *Attorney, Agent, or Firm* — Chiris A. Watt

(57) ABSTRACT

Systems and methods of the present invention provide for the spinning and appraisal of a domain name. A list of keywords may be extracted from a domain name entered into a user interface on a client. These keywords may be compared to potential matches in a database and a result set may be compiled and displayed to the user. The client may also display a certified domain name appraisal using a plurality of logical groupings within a domain name appraisal process. This appraisal process may also include a multiplier derived from comparisons of registration statistics for various top level domains.

20 Claims, 6 Drawing Sheets

OTHER PUBLICATIONS

LeapFish Free Domain Name Appraisal: Find Domain Worth, May 19, 2006, pp. 1-4.*
Domain Appraisal, Mar. 3, 2009, pp. 1-7.*
Morgan, Do You Really Understand Domain Value? Aug. 16, 2009, pp. 1-7.*
Pixelrage, The Only Domain Name Appraisal Guide You'll Ever Need, Sep. 15, 2008, pp. 1-6.*
High Value Domain Yard, Apr. 3, 2009, pp. 1-5.*
Chef Patrick, What Makes a Premium Domain Name, Oct. 1, 2008, pp. 1-4.*
Douglas, Why the Live Domain Auction Bombed (and Why I'm Not Surprised)—Domain Name Wire, Comment 21, Feb. 4, 2009, pp. 1-7.*
kevinfrost, Domain Name Investing: The Easiest Way to Make Money Online?, Apr. 12, 2010, pp. 1-7.*
Estibot.com User's Guide, Feb. 4, 2010, pp. 1-22.*
Domain Name Appraisal FAQ, Feb. 26, 2009, pp. 1-2.*
Jul. 26, 2012 response to Apr. 26, 2012 Office Action in related U.S. Appl. No. 12/708,752.
Jul. 27, 2012 response to Apr. 27, 2012 Office Action in related U.S. Appl. No. 12/708,775.
May 9, 2012 office action in related U.S. Appl. No. 12/708,809.
Aug. 3, 2012 response to May 9, 2012 office action in related U.S. Appl. No. 12/708,809.
Jun. 1, 2012 office action in related U.S. Appl. No. 12/894,558.
Jan. 23, 2013 response to Oct. 26, 2012 office action in related U.S. Appl. No. 12/708,809.
Jan. 31, 2013 office action in related U.S. Appl. No. 12/708,809.
Mar. 7, 2013 office action in related U.S. Appl. No. 12/894,519.
Mar. 21, 2013 response to Jan. 31, 2013 office action in related U.S. Appl. No. 12/708,809.

* cited by examiner

APPRAISING DOMAIN NAMES USING COMPARATIVE DATA

CROSS REFERENCE TO RELATED PATENT APPLICATIONS

This patent application is related to the following concurrently-filed patent applications:

U.S. patent application Ser. No. 12/708,752, "SEMANTIC DOMAIN NAME SPINNING."

U.S. patent application Ser. No. 12/708,775, "AUTOMATED SEMANTIC DOMAIN SPINNING TOOLS.".

U.S. patent application Ser. No. 12/708,793, "APPRAISING DOMAIN NAMES USING COMPARATIVE DATA."

The subject matter of all patent applications is commonly owned and assigned to Go Daddy Operating Company, LLC. All prior applications are incorporated herein in their entirety by reference.

FIELD OF THE INVENTION

The present inventions generally relate to the field of domain names and specifically to the field of semantic domain name spinning and domain appraisal.

SUMMARY OF THE INVENTION

The present invention provides methods and systems for spinning a domain name (automated tools used to create domain permutations) based on semantic input. An exemplary method may comprise several steps including the step of passing a domain name into the system by receiving the domain name via an interface on a client operated by a user of the system. The system may then parse the domain name into keywords and build an array of similar keywords based on a semantic search. Two different comparisons may then be made: First, in spinning the domain name for auction or appraisal, the array of similar keywords may be compared to information in data storage. If an exact match is found in the database, the exact match may be appended to the result set in top priority and the result set may be returned. In another embodiment, the array of similar keywords may be compared against one or more available domain names. If an exact match is found within the one or more available domain names, the exact match may be appended to the result set in top priority and the result set may be returned. The returned result set may then be appraised for value to the user.

The present invention also provides methods and systems for an automated appraisal of the domain name above for a certified appraisal process, using an appraisal process algorithm. The appraisal may be accomplished by breaking the valuation of the domain into five logical groupings, possibly including evaluation of "5 P's" related to the domain name. Evaluation of "precision" may include the number of distinct keywords found, the length of the name and the number of keywords found in the dictionary. Evaluation of "popularity" may include various search engine search result metrics and tracking of words searched per month. Evaluation of "presence" may include the age of the domain, and the rank of the web site according to web ranking services or software. Evaluation of "pattern" may include the number of premium characters, the part of speech (such as noun, plural noun, verb, adjective, etc., possibly considering if the domain is a one word domain), the relationship of vowels and consonants etc. (possibly considering if the domain is a 4-5 character word). Evaluation of Pay-Per-Click, or PPC, may include the maximum number of pay-per-click bids from various advertising tracking services or software, and the number of ads returned within search engine searches. A dynamic multiplier based on registration statistics for each of several top level domains (TLDs) may then be applied to the domain evaluation. This multiplier may be used to give a very accurate measure of domain scarcity to let a user or evaluator know how rare a domain name is.

The above features and advantages of the present invention will be better understood from the following detailed description taken in conjunction with the accompanying drawings.

DETAILED DESCRIPTION

Figure 1:
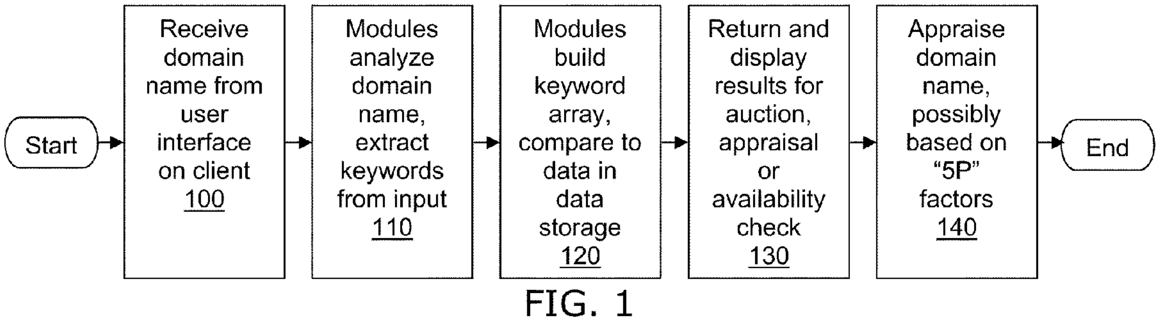
FIG. 1 is a flow diagram illustrating a possible embodiment of a method for semantic domain name spinning.

The present inventions will now be discussed in detail with regard to the attached drawing figures that were briefly described above. In the following description, numerous specific details are set forth illustrating the Applicant's best mode for practicing the invention and enabling one of ordinary skill in the art to make and use the invention. It will be obvious, however, to one skilled in the art that the present invention may be practiced without many of these specific details. In other instances, well-known machines, structures, and method steps have not been described in particular detail in order to avoid unnecessarily obscuring the present invention. Unless otherwise indicated, like parts and method steps are referred to with like reference numerals.

A network is a collection of links and nodes (e.g., multiple computers and/or other devices connected together) arranged so that information may be passed from one part of the network to another over multiple links and through various nodes. Examples of networks include the Internet, the public switched telephone network, the global Telex network, computer networks (e.g., an intranet, an extranet, a local-area network, or a wide-area network), wired networks, and wireless networks.

The Internet is a worldwide network of computers and computer networks arranged to allow the easy and robust exchange of information between computer users. Hundreds of millions of people around the world have access to computers connected to the Internet via Internet Service Providers (ISPs). Content providers place multimedia information (e.g., text, graphics, audio, video, animation, and other forms of data) at specific locations on the Internet referred to as websites. The combination of all the websites and their corresponding web pages on the Internet is generally known as the World Wide Web (WWW) or simply the Web.

For Internet users and businesses alike, the Internet continues to be increasingly valuable. More people use the Web for everyday tasks, from social networking, shopping, banking, and paying bills to consuming media and entertainment. E-commerce is growing, with businesses delivering more services and content across the Internet, communicating and collaborating online, and inventing new ways to connect with each other.

Prevalent on the Web are multimedia websites, some of which may offer and sell goods and services to individuals and organizations. Websites may consist of a single webpage, but typically consist of multiple interconnected and related web pages. Websites, unless extremely large and complex or have unusual traffic demands, typically reside on a single server and are prepared and maintained by a single individual or entity. Menus and links may be used to move between different web pages within the website or to move to a different website as is known in the art. The interconnectivity of web pages enabled by the Internet can make it difficult for Internet users to tell where one website ends and another begins.

Websites may be created using HyperText Markup Language (HTML) to generate a standard set of tags that define how the web pages for the website are to be displayed. Users of the Internet may access content providers' websites using software known as an Internet browser, such as MICROSOFT INTERNET EXPLORER or MOZILLA FIREFOX. After the browser has located the desired webpage, it requests and receives information from the webpage, typically in the form of an HTML document, and then displays the webpage content for the user. The user then may view other web pages at the same website or move to an entirely different website using the browser.

Some Internet users, typically those that are larger and more sophisticated, may provide their own hardware, software, and connections to the Internet. But many Internet users either do not have the resources available or do not want to create and maintain the infrastructure necessary to host their own websites. To assist such individuals (or entities), hosting companies exist that offer website hosting services. These hosting providers typically provide the hardware, software, and electronic communication means necessary to connect multiple websites to the Internet. A single hosting provider may literally host thousands of websites on one or more hosting servers.

Browsers are able to locate specific websites because each website, resource, and computer on the Internet has a unique Internet Protocol (IP) address. Presently, there are two standards for IP addresses. The older IP address standard, often called IP Version 4 (IPv4), is a 32-bit binary number, which is typically shown in dotted decimal notation, where four 8-bit bytes are separated by a dot from each other (e.g., 64.202.167.32). The notation is used to improve human readability. The newer IP address standard, often called IP Version 6 (IPv6) or Next Generation Internet Protocol (IPng), is a 128-bit binary number. The standard human readable notation for IPv6 addresses presents the address as eight 16-bit hexadecimal words, each separated by a colon (e.g., 2EDC:BA98:0332:0000:CF8A:000C:2154:7313).

IP addresses, however, even in human readable notation, are difficult for people to remember and use. A Uniform Resource Locator (URL) is much easier to remember and may be used to point to any computer, directory, or file on the Internet. A browser is able to access a website on the Internet through the use of a URL. The URL may include a Hypertext Transfer Protocol (HTTP) request combined with the website's Internet address, also known as the website's domain name. An example of a URL with a HTTP request and domain name is: http://www.companyname.com. In this example, the "http" identifies the URL as a HTTP request and the "companyname.com" is the domain name.

Domain names are much easier to remember and use than their corresponding IP addresses. The Internet Corporation for Assigned Names and Numbers (ICANN) approves some Generic Top-Level Domains (gTLD) and delegates the responsibility to a particular organization (a "registry") for maintaining an authoritative source for the registered domain names within a TLD and their corresponding IP addresses. For certain TLDs (e.g., .biz, .info, .name, and .org) the registry is also the authoritative source for contact information related to the domain name and is referred to as a "thick" registry. For other TLDs (e.g., .com and .net) only the domain name, registrar identification, and name server information is stored within the registry, and a registrar is the authoritative source for the contact information related to the domain name. Such registries are referred to as "thin" registries. Most gTLDs are organized through a central domain name Shared Registration System (SRS) based on their TLD.

The process for registering a domain name with .com, .net, .org, and some other TLDs allows an Internet user to use an ICANN-accredited registrar to register their domain name. For example, if an Internet user, John Doe, wishes to register the domain name "mycompany.com," John Doe may initially determine whether the desired domain name is available by contacting a domain name registrar. The Internet user may make this contact using the registrar's webpage and typing the desired domain name into a field on the registrar's webpage created for this purpose. Upon receiving the request from the Internet user, the registrar may ascertain whether "mycompany.com" has already been registered by checking the SRS database associated with the TLD of the domain name. The results of the search then may be displayed on the webpage to thereby notify the Internet user of the availability of the domain name. If the domain name is available, the Internet user may proceed with the registration process. If the domain name is not available for registration, the Internet user may keep selecting alternative domain names until an available domain name is found.

A Method and System for Semantic Domain Name Spinning

Several different methods may be used to provide and manage the disclosed invention. In an example embodiment illustrated in FIG. 1, a user may enter a domain name into a user interface on a client, possibly seeking more information about the domain name, such as domain auction or other aftermarket information, domain appraisal or evaluation information, or information about the domain's availability (Step 100). Any combination of software modules used together with hardware on a server in a data center may receive and analyze the submitted information, possibly supplemented with additional information from data storage within the data center. One or more software modules may use this analysis to extract one or more keywords from the received domain name (Step 110). Using these one or more keywords, one or more modules on a communicatively coupled server or client may build a keyword array, and this keyword array may be compared to possible matches contained in a database within data storage, which may also be communicatively coupled to the server or client (Step 120). If a match is found, the match may be appended to the result set, with exact matches in top priority; otherwise, the result set may be returned to the user and displayed on the client for purposes of domain auction, domain aftermarket, domain appraisal or availability of the domain name (Step 130). An appraisal for valuation of the domain name may also be returned and displayed to the user on the client, possibly based on the "5P" appraisal factors, discussed in detail below (Step 140).

Figure 2:
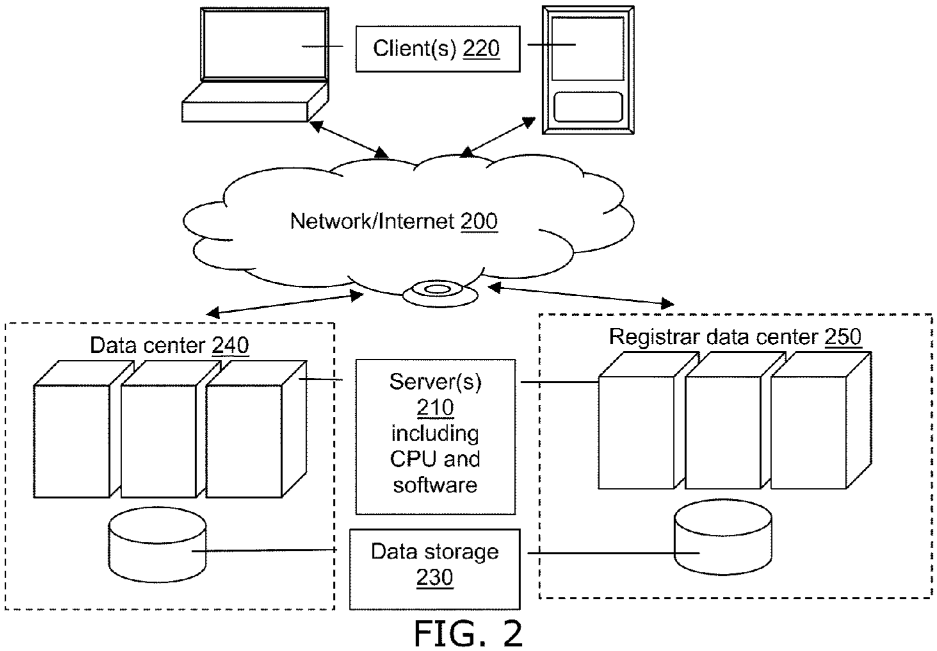
FIG. 2 illustrates a possible system for semantic domain name spinning and appraising a domain name.

Several different environments may be used to accomplish the steps of embodiments disclosed herein. FIG. 2 demonstrates a streamlined example of such an environment and illustrates a non-limiting example of a system and/or structure that may be used to accomplish the methods and embodiments disclosed and described herein. Such methods may be performed by any central processing unit (CPU) in any computing system, such as a microprocessor running on at least one server 210 and/or client 220, and executing instructions stored (perhaps as scripts and/or software, possibly as software modules) in computer-readable media accessible to the CPU, such as a hard disk drive on a server 210 and/or client 220.

The example embodiments herein place no limitations on whom or what may comprise users. Thus, as non-limiting examples, users may comprise any individual, entity, business, corporation, partnership, organization, governmental entity, and/or educational institution that may have occasion to seek information for domain spinning or appraisal.

The example embodiments shown and described herein exist within the framework of a network 200 and should not limit possible network configuration or connectivity. Such a network 200 may comprise, as non-limiting examples, any combination of the Internet, the public switched telephone network, the global Telex network, computer networks (e.g., an intranet, an extranet, a local-area network, or a wide-area network), a wired network, a wireless network, a telephone network, a corporate network backbone or any other combination of known or later developed networks.

At least one server 210 and at least one client 220 may be communicatively coupled to the network 200 via any method of network connection known in the art or developed in the future including, but not limited to wired, wireless, modem, dial-up, satellite, cable modem, Digital Subscriber Line (DSL), Asymmetric Digital Subscribers Line (ASDL), Virtual Private Network (VPN), Integrated Services Digital Network (ISDN), X.25, Ethernet, token ring, Fiber Distributed Data Interface (FDDI), IP over Asynchronous Transfer Mode (ATM), Infrared Data Association (IrDA), wireless, WAN technologies (T1, Frame Relay), Point-to-Point Protocol over Ethernet (PPPoE), and/or any combination thereof.

The server(s) 210 and client(s) 220 (along with software modules and the data storage 230 disclosed herein) may be communicatively coupled to the network 200 and to each other in such as way as to allow a user to enter into a user interface on the client 220, and for the server 210 to receive, the domain name to generate the keywords to search information in data storage 230 for domain spinning information related to domain aftermarket, domain appraisal, domain availability and/or accomplish any other methods disclosed herein.

Such server(s) 210 may comprise any computer or program that provides services to other computers, programs, or users either in the same computer or over a computer network 200. As non-limiting examples, the server 210 may comprise application, communication, mail, database, proxy, fax, file, media, web, peer-to-peer, standalone, software, or hardware servers (i.e., server computers) and may use any server format known in the art or developed in the future (possibly a shared hosting server, a virtual dedicated hosting server, a dedicated hosting server, a cloud hosting solution, a grid hosting solution, or any combination thereof) and may be used, for example to provide access to the Internet, domain auction, aftermarket, availability or appraisal information, registrar domain information and/or other data requested by a client 220.

The server 210 may exist within a server cluster, as illustrated. These clusters may include a group of tightly coupled computers that work together so that in many respects they can be viewed as though they are a single computer. The components may be connected to each other through fast local area networks which may improve performance and/or availability over that provided by a single computer.

The software modules used in the context of the current invention may be stored in the memory of—and run on—at least one server 210 or client 220. As a non-limiting example of such software modules, a keyword extraction module may be used to extract keywords from the domain name to retrieve and compare information stored in data storage 230 for purposes of domain auction, domain appraisal and/or domain availability. A domain appraisal module, or several related software modules working together (disclosed below), may likewise be used to appraise the valuation of the domain name, etc. The software modules may comprise software and/or scripts containing instructions that, when executed by a microprocessor on a server 210 or client 220, cause the microprocessor to accomplish the purpose of the module or the methods disclosed herein, in this example to extract keywords from a domain name, retrieve and compare related keyword and/or domain name information from data storage 230, appraise the valuation of the domain name and/or display this domain and other retrieved information to the user on a client 220.

The client 220 may be any computer or program that provides services to other computers, programs, or users either in the same computer or over a computer network 200. As non-limiting examples, the client 220 may be an application, communication, mail, database, proxy, fax, file, media, web, peer-to-peer, or standalone computer, cell phone, personal digital assistant (PDA), etc. which may contain an operating system, a full file system, a plurality of other necessary utilities or applications or any combination thereof on the client 220. Non limiting example programming environments for client applications may include JavaScript/AJAX (client side automation), ASP, JSP, Ruby on Rails, Python's Django, PHP, HTML pages or rich media like Flash, Flex or Silverlight.

The client 220 that may be used to connect to the network 200 to accomplish the illustrated embodiments may include, but are not limited to, a desktop computer, a laptop computer, a hand held computer, a terminal, a television, a television set top box, a cellular phone, a wireless phone, a wireless hand held device, an Internet access device, a rich client, thin client, or any other client functional with a client/server computing architecture. Client software may be used for authenticated remote access to a hosting computer or server. These may be, but are not limited to being accessed by a remote desktop program and/or a web browser, as are known in the art.

Figure 8:
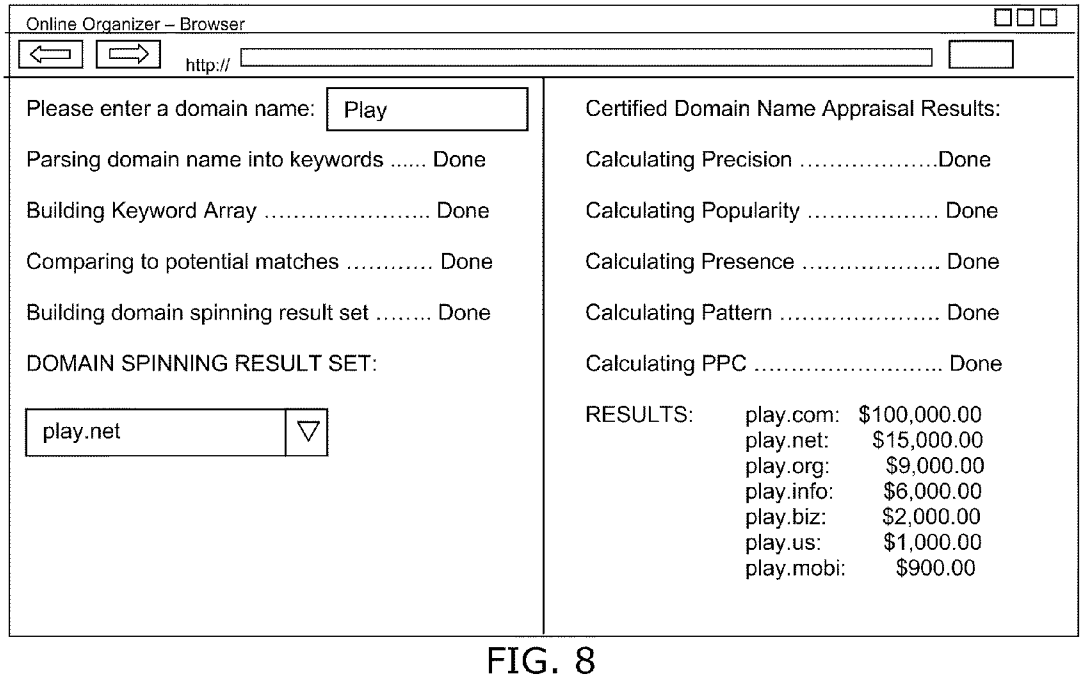
FIG. 8 illustrates a possible embodiment of an interface for displaying the results of the domain spinning and the certified domain appraisal process.

The user interface displayed on the client 220 or the server 210 may be any graphical, textual, scanned and/or auditory information a computer program presents to the user, and the control sequences such as keystrokes, movements of the computer mouse, selections with a touch screen, scanned information etc. used to control the program. Examples of such interfaces include any known or later developed combination of Graphical User Interfaces (GUI) or Web-based user interfaces as seen in FIG. 8, Touch interfaces, Conversational Interface Agents, Live User Interfaces (LUI), Command line interfaces, Noncommand user interfaces, Object-oriented User Interfaces (OOUI) or Voice user interfaces. The domain name information generated, or any other information, may be accepted using any field, widget and/or control used in such interfaces, including but not limited to a text-box, text field, button, hyper-link, list, drop-down list, check-box, radio button, data grid, icon, graphical image, embedded link, etc.

The server 210 and/or client 220 may be communicatively coupled to data storage 230 of domain name information, domain name appraisal information, domain name spinning information or any other information requested. The data storage 230 may be any computer components, devices, and/or recording media that may retain digital data used for computing for some interval of time. The storage may be capable of retaining stored content for the domain information or any other data requested, on a single machine or in a cluster of computers over the network 200, in separate memory areas of the same machine such as different hard drives, or in separate partitions within the same hard drive, such as a database partition.

Non-limiting examples of the data storage 230 may include, but are not limited to, a Network Area Storage, ("NAS"), which may be a self-contained file level computer data storage connected to and supplying a computer network with file-based data storage services. The storage subsystem may also be a Storage Area Network ("SAN"—an architecture to attach remote computer storage devices to servers in such a way that the devices appear as locally attached), an NAS-SAN hybrid, any other means of central/shared storage now known or later developed or any combination thereof.

Structurally, the data storage 230 may comprise any collection of data. As non-limiting examples, the data storage 230 may comprise a local database, online database, desktop database, server-side database, relational database, hierarchical database, network database, object database, object-relational database, associative database, concept-oriented database, entity-attribute-value database, multi-dimensional database, semi-structured database, star schema database, XML database, file, collection of files, spreadsheet, and/or other means of data storage such as a magnetic media, hard drive, other disk drive, volatile memory (e.g., RAM), non-volatile memory (e.g., ROM or flash), and/or any combination thereof.

The server(s) 210 or software modules within the server(s) 210 may use query languages such as MSSQL or MySQL to retrieve the content from the data storage 230. Server-side scripting languages such as ASP, PHP, CGI/Perl, proprietary scripting software/modules/components etc. may be used to process the retrieved data. The retrieved data may be analyzed in order to determine domain names and keywords recognized by the scripting language, key words to be matched to those found in data storage, availability of domain names, comparisons to appraisals of other domain names or any other method steps disclosed herein.

Another environment similar to the data center 240 may also be used to access information about a domain name on a registrar's server 210 in a registrar's data center 250. As the user accesses information about a domain name, another command from the software modules may be used to redirect to a registrar's server 210 in a registrar's data center 250. This server may also contain software components which allow a data storage 230, either separate from or integrated into the registrar's server, to access information regarding domain name spinning and appraisal for the users. The registrar's server 210 may use the registrar's data storage 230 and software modules or components on the server 210 to search for information relating to the domain name spinning or appraisal as requested by the user. If such information is available, the software modules or components on the server 210 and/or registrar's server 210 may be used to forward this information from the data storage 230 to the user/potential customer. This information may also be forwarded to an email account of the user.

In a non-limiting example embodiment, the data center 240 and/or registrar data center 250 may provide hosting services for websites, services or software relating to the domain information, or any related hosted website including, but not limited to hosting one or more computers or servers in a data center 240/250 as well as providing the general infrastructure necessary to offer hosting services to Internet users including hardware, software, Internet web sites, hosting servers, and electronic communication means necessary to connect multiple computers and/or servers to the Internet or any other network 200. These data centers 240/250 or the related clients 220 may accept messages from text messages, SMS, web, mobile web, instant message, third party API projects or other third party applications.

In an example embodiment illustrated in FIG. 1, a domain name may be received via information entered into an interface on a client 220 operated by a user of the system. The system may then parse the domain name into keywords and build an array of similar keywords based on a semantic search.

Figure 3:
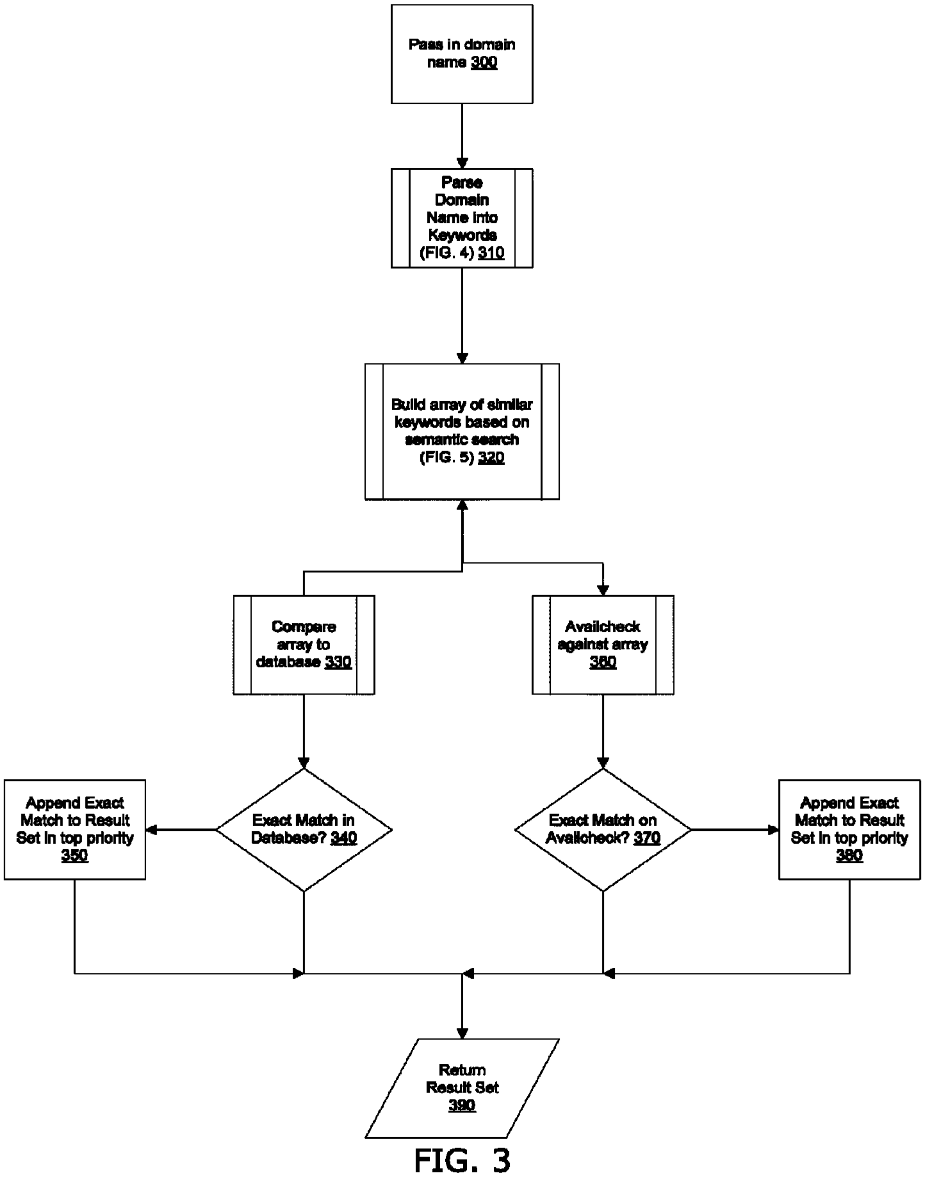
FIG. 3 is a flow diagram illustrating a possible embodiment of a method for semantic domain name spinning.

FIG. 3 shows that the embodiment illustrated in FIG. 1, as well as other disclosed embodiments, may include the steps of passing the domain name into the system (Step 300), parsing the domain name into keywords, as well as all subsequent steps described below associated with FIG. 4 (Step 310), building an array of similar keywords based on a semantic search, as well as all subsequent steps described below associated with FIG. 5 (Step 320) and comparing the keywords to return a result set (Step 390).

Two different comparisons may be made: First, in spinning the domain name, such as for auction, aftermarket or appraisal, the array of similar keywords based on the semantic search may be compared to information in data storage 230 such as a database (Step 330). If an exact match is found in the database (Step 340), the exact match may be appended to the result set in top priority (Step 350) and the result set, including the prioritized exact matches, may be returned (Step 390). In another embodiment, the array may be compared against one or more available domain names (Step 360). In spinning the domain name for a check against domain availability (Step 360), if an exact match is found in the array against a check for domain availability (Step 370), the exact match may be appended to the result set in top priority (Step 380) and the result set, including the prioritized exact matches, may be returned (Step 390). The returned result set may then be appraised for valuation of the domain name for the user (Step 140).

Figure 4:
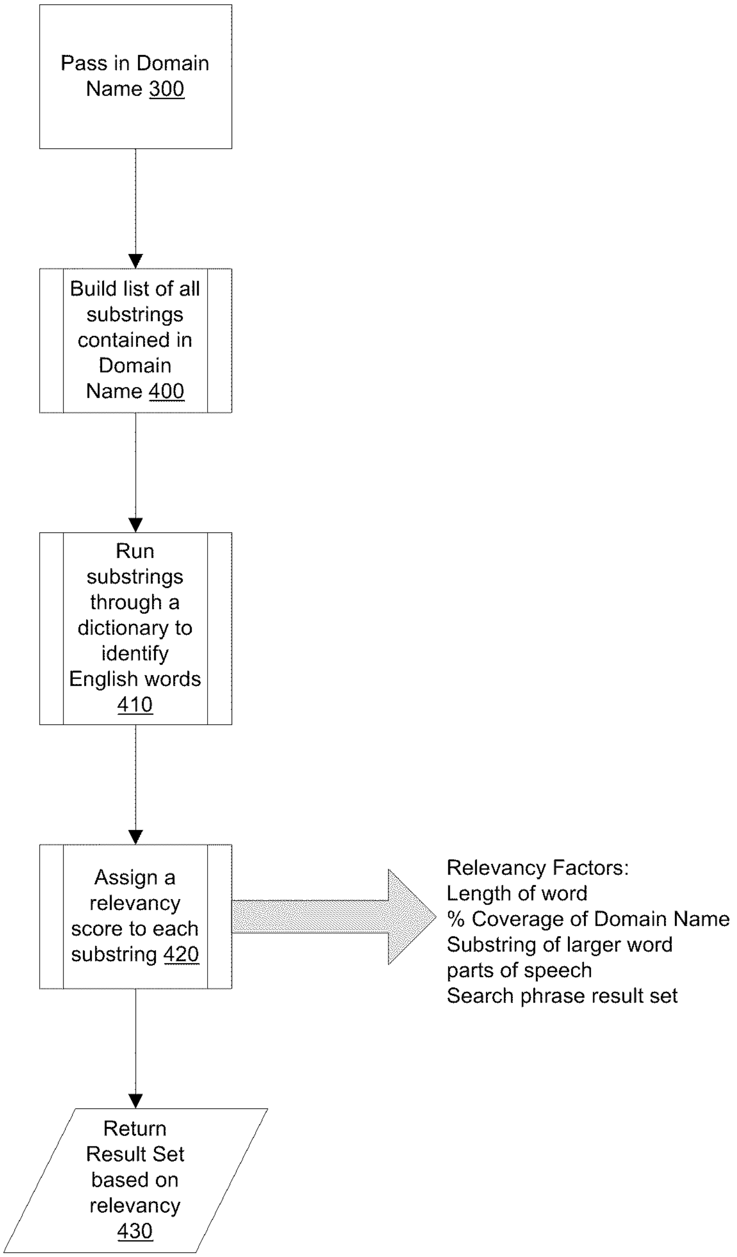
FIG. 4 is a flow diagram illustrating a possible embodiment of a method for semantic domain name spinning.

FIG. 4 shows that the embodiment illustrated in FIGS. 1 and 3, as well as other disclosed embodiments, may include the steps of passing the domain name in to the system (Step 300), building a list of all strings and/or substrings contained in the domain name (Step 400), running the strings and/or substrings through a dictionary to identify English words within the list of strings and/or substrings built from the domain name (Step 410), assigning a relevancy score to each string and/or substring (Step 420) and returning a result set based on the relevancy score assigned to each string and/or substring (Step 430). As previously disclosed, Steps 400-430, illustrated in FIG. 4, may be, but are not limited to, being sub-steps of parsing a domain name into keywords (Step 310).

The step of assigning a relevancy score to each string and/or substring (Step 420) may include, but are not limited to, several relevancy factors, including the length of the word, the percentage of coverage of the domain name, whether the substring is a substring of a larger word and/or string, the parts of speech associated with the string and/or substring or domain name and/or a search phrase result set.

Figure 5:
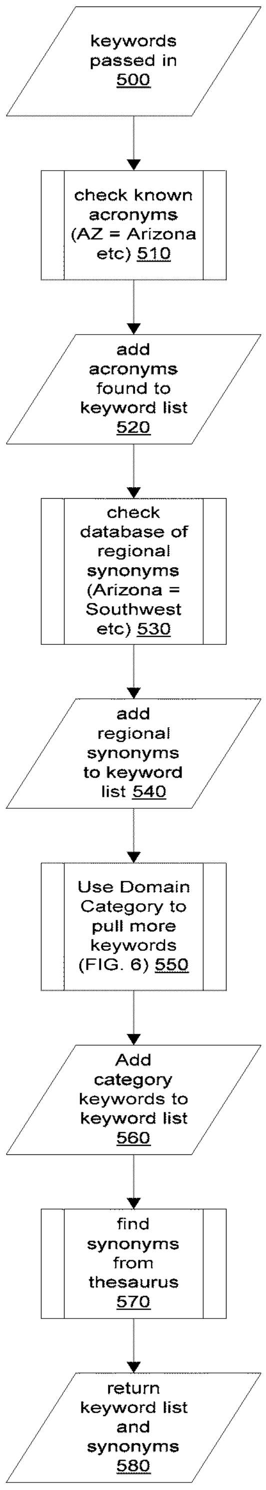
FIG. 5 is a flow diagram illustrating a possible embodiment of a method for semantic domain name spinning.

FIG. 5 shows that the embodiment illustrated in FIGS. 1 and 3, as well as other disclosed embodiments, may include the step of passing the domain name in to the system (Step 300). Passing in these keywords (Step 500) may allow additional acronyms, regional synonyms, domain category keywords and synonyms from a thesaurus to be added to the keyword list and synonyms. These additional tools may be used to build an array of similar keywords based on a semantic search (Step 320).

Once the keywords are passed in to the system (Step 500), the keywords and/or domain name may be checked for known acronyms or abbreviations (Step 510). As a non-limiting example, the keyword and/or domain name may recognize that ASU is an acronym for Arizona State University, or that AZ is an abbreviation for Arizona. Any acronyms and/or abbreviations found may then be added to the keyword list and/or array (Step 520).

Data storage 230, such as a database, may be used to check the domain name, each of the words in the list of keywords, substrings of the domain name/keywords, or the previously disclosed acronyms/abbreviations for matches of regional synonyms. As a non-limiting example, "Arizona State University," "Arizona," "ASU" and "AZ" may all be recognized as being synonymous with and/or associated with the word "Southwest." (Step 530). The regional synonyms may then be added to the keyword list (Step 540).

A series of domain categories may be established and used to pull more keywords, as well as all subsequent steps described below associated with FIG. 6 (Step 550). The category keywords pulled may then be added to the keyword list (Step 560). A thesaurus may then be used to find synonyms for the domain name, each of the words in the list of keywords, substrings of the domain name/keywords, or the previously disclosed acronyms/abbreviations. The keyword list, as well as any synonyms (regional or otherwise) and/or acronyms may then be returned (Step 580). As previously disclosed, Steps 500-580, illustrated in FIG. 5, may be, but are not limited to being sub-steps of building an array of similar keywords based on a semantic search (Step 320).

Figure 6:
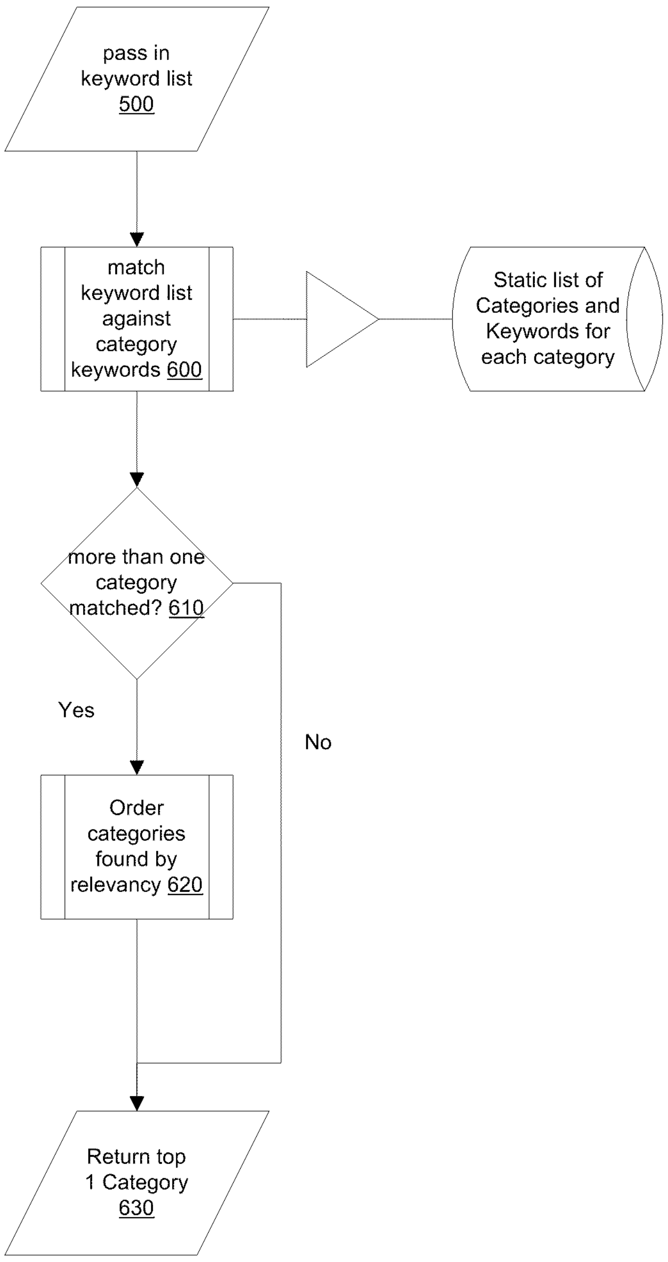
FIG. 6 is a flow diagram illustrating a possible embodiment of a method for semantic domain name spinning.

FIG. 6 shows that the embodiment illustrated in FIGS. 1, 3 and 5, as well as other disclosed embodiments, may include the steps of passing the domain name in to the system (Step 300). Once the domain name, list of keywords, acronyms/abbreviations and/or synonyms are passed in to the system (Step 500), these elements may be matched against one or more category keywords (Step 600). As seen in FIG. 6, these category keywords may be stored in data storage 230 such as a database containing a static list of categories and keywords for each category.

After matching the keyword list against the category keywords (Step 600), a determination may be made as to whether more than one category was matched (Step 610). If so, the categories found may be ordered by relevancy (Step 620). Whether or not more than one category was matched (Step 610), the top 1 category may be returned (Step 630). If more than one category was matched (Step 610), the top 1 category, as well as the categories ordered by relevancy, may also be returned (Step 630). As previously disclosed, Steps 600-630, illustrated in FIG. 6, may be, but are not limited to being sub-steps of using the domain name, list of keywords, acronyms/abbreviations and/or synonyms to pull additional keywords (Step 550).

The additional steps included in the embodiments illustrated in FIGS. 1-6 are not limited to the embodiment shown in FIG. 1, or their respective illustrated embodiments, and may be combined in several different orders and modified within multiple other disclosed embodiments. Likewise, the method steps disclosed herein may be accomplished by a software module executed on a server and/or client configured to accomplish that method step. As non-limiting examples, the method steps disclosed above may be accomplished by, but are not limited to a domain name keyword parsing software module, a keyword array building software module, a result set returning software module, an array and/or domain name comparison software module etc.

A Method and System for Domain Name Appraisal and Valuation

Several different methods may be used to provide and manage the disclosed invention. In an example embodiment illustrated in FIG. 7, a user may enter a domain name into a user interface on a client, possibly seeking more information about an appraisal or valuation of the domain name. In another embodiment, the domain name may be entered automatically into the system as a result of domain spinning, described in detail above. Any combination of software modules used together with hardware on a client 220 in a data center 240/250 may receive and analyze the submitted information from a user interface on a client 220, possibly supplemented by additional information from data storage 230 within one or more data centers 240/250 (as illustrated in FIG. 2, and described in detail above). The software modules may use this analysis to create an automated appraisal of a domain name for a certified appraisal process, possibly using an appraisal process algorithm, the appraisal process algorithm possibly contained within an appraisal software module.

Figure 7:
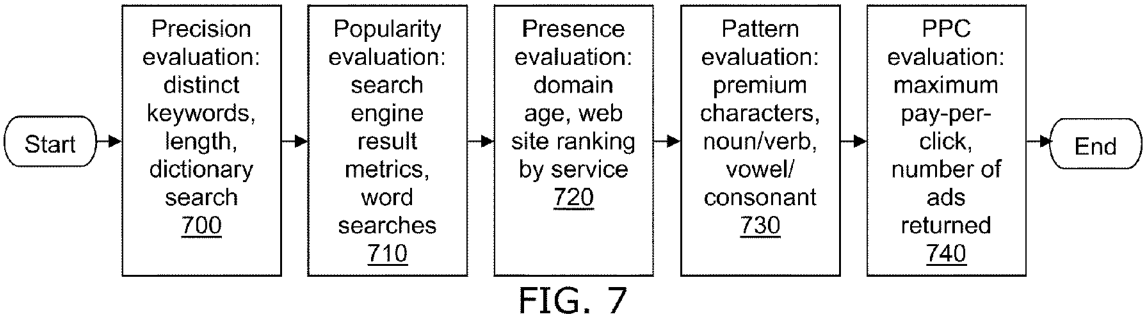
FIG. 7 is a flow diagram illustrating a possible embodiment of a method for appraising a domain name.

The appraisal may be accomplished, as seen in FIG. 7, by dividing the valuation of the domain into five logical groupings, including evaluation of "5 P's" related to the domain name. Evaluation of "precision" may include the number of distinct keywords found, the length of the domain name and the number of keywords found in the dictionary (Step 700). Evaluation of "popularity" may include various search engine search result metrics and tracking of words searched per month (Step 710). Evaluation of "presence" may include the age of the domain, and the rank of the web site according to web ranking services or software (Step 720). Evaluation of "pattern" may include the number or percentage of premium characters, the part of speech (such as noun, plural noun, verb, adjective, etc., possibly considering if the domain is a one word domain), the relationship of vowels and consonants (possibly considering if the domain is a 4-5 character word) (Step 730). Evaluation of Pay-Per-Click, or PPC, may include the maximum number of pay-per-click bids from various advertising tracking services of software, and the number of ads returned within search engine searches (Step 740). A dynamic multiplier based on registration statistics for each top level domain (TLD), as well as other evaluation elements described in detail below, may then be applied to the domain appraisal and/or valuation. This may be used to give a very accurate measure of domain scarcity to let a user or evaluator know how rare a domain name is.

Precision, the first of the 5 P's evaluated, may include one or more precision-determining elements. These precision-determining elements may include the following: the number of distinct keywords found in the domain name, whether the keywords are found in the dictionary, possibly including the number of keywords found, the length of the domain name and whether numerals are found in the domain name, possibly including the number of numerals found. These precision-determining elements may be stored in data storage 230 and assigned values used to determine the domain name's appraisal value and/or valuation.

A precision-determining algorithm may be established, stored and/or contained within one or more software modules, possibly one or more precision-determining software modules. Such algorithms and software modules may be stored and executed within an environment in a data center 240/250 using a server 210, client 220 and/or data storage 230, any or all of which may be communicatively coupled to a network 200.

This precision-determining algorithm, which may be substantially similar to that demonstrated in the non-limiting example embodiment(s) below and throughout this disclosure, may assign values to the precision-determining elements and/or may use these and/or other previously-stored precision-determining elements to determine the precision of the domain name, which in turn may be used to determine the appraisal value and/or valuation of the domain name.

The one or more software modules, possibly one or more precision-determining software modules containing the precision-determining algorithm, may be executed by a processor on a server 210, and the results may be sent through a network 200 and displayed on a user interface on a client 220.

In another non-limiting example embodiment, the elements may be stored in a local database, spreadsheet and/or any other data storage 230 on the client 220. In this embodiment, one or more software modules, possibly one or more precision-determining software modules, software modules within a local database or spreadsheet, or any combination thereof may be used to calculate and execute the precision-determining algorithm.

As a non-limiting example, a spreadsheet may determine the Precision of the domain name by using any combination of software modules described above to store, calculate and/or execute the following precision-determining algorithm:

```
=(IF(AND(words=1,dictionary=1),500,0)+IF(words=2,0,0)+
IF(words=3,−100,0)+IF(words=4,−500,0)+IF(words>4,−1000,0)+
IF(dictionary=1,100,−100)+IF(length<3,500,0)+IF(length=3,400,0)+
IF(length=4,100,0)+IF(length=5,25,0)+IF(AND(length>5,length<11),
0,0)+IF(AND(length>10,length<16),−50,0)+IF(length>15,−
100,0)+IF(numbers=1,−70,0))
```

In this non-limiting example, the spreadsheet may have columns, and/or data storage 230 may have a data field for each of the precision-determining elements, and may have an additional column and/or data field to store the calculated Precision of the domain name. In other embodiments, each of the precision-determining elements, as well as the calculated Precision of the domain name may be calculated and/or stored in data fields in data storage 230. The precision-determining elements may include, but are not limited to, "words," "dictionary," "length" and "numbers."

The column and/or data field for "words" may calculate and/or store the number of words and/or keywords in the domain name. As non-limiting examples, america.us, jackaroo.com, urir.com, flippity.com, planets.com, witchcraft.com, masks.org, fuel.net, whatever.com, guns.com, compassion.org, antalya.com, joust.com and islam.net may all be one-word domain names, and thus would have a number 1 calculated and/or stored in the "words" column of the spreadsheet and/or data field of data storage 230.

Two-word domain names, having a number 2 calculated and/or stored in the "words" column and/or data field may include, as non-limiting examples, 12steps.com, finnishfelines.com, iowacars.com, pokerpinnacle.com, smokelover.com, any-cell.com, safelysent.com, sweetrings.com, goldminers.com, globalwarming.com, tagcloud.com, fungamez.com and tourbus.com.

Three-word domain names, having a number 3 calculated and/or stored in the "words" column and/or data field may include, as non-limiting examples, figureitout.com, onlinelampguide.com, yourfavoriteplace.com, aroundtheworld.com and realestateads.com.

The column and/or data field for "dictionary" may calculate and/or store a determination of whether the domain name and/or any keywords in the domain name (without the TLD or "top level domain" such as .com, .us, .net, .org etc.) are a word or words found in the dictionary. This determination can be calculated and/or stored as a TRUE/FALSE value, or possibly numerically as a 1 or 0.

As non-limiting examples planets.com, guns.com, whatever.com and witchcraft.com may all be found in the dictionary, and thus would have a number 1 or a value of TRUE calculated and/or stored in the "dictionary" column of the spreadsheet and/or data field of data storage 230, while urir.com, flippity.com, pokerpinacle.com and fungamez.com would have a number 0 or a value of FALSE calculated and/or stored in the "dictionary" column of the spreadsheet or data field of data storage 230.

The column and/or data field for "length" may calculate (possibly using a =LEN([appropriate field]) calculation in a database) and/or store the length of, or number of letters in, the domain name and/or any keywords in the domain name (without the TLD or "top level domain" such as .com, .us, .net, .org etc.). In other words, "length" may determine and store how many characters are in the word and/or any keywords within the domain name. As a non-limiting example, planets.com would have a length of 7 letters, and thus would have a number 7 calculated and/or stored in the "length" column of the spreadsheet and/or data field of data storage 230. Likewise, guns.com would have a length of 4 letters, and thus would have a number 4 calculated and/or stored in the "length" column of the spreadsheet or data field of data storage 230.

The column and/or data field for "numbers" may calculate and/or store a determination of whether the domain name and/or keywords in the domain name contain numbers. In other words, "numbers" may determine if the domain contains numerals. This determination can be calculated and/or stored as a TRUE/FALSE value, or possibly numerically as a 1 or 0. As non-limiting examples 12steps.com contains numerals, and thus would have a number 1 or a value of TRUE calculated and/or stored in the "numbers" column of the spreadsheet and/or data field of data storage 230, while the other domain names listed above would have a number 0 or a value of FALSE calculated and/or stored in the "numbers" column of the spreadsheet and/or data field of data storage 230.

After the precision-determining elements are calculated and/or stored, the precision-determining algorithm may then evaluate and use any combination of the precision-determining elements or other disclosed elements to calculate and/or store the Precision of the domain name. The value assigned to a particular precision-determining element may increase or decrease the value of the Precision of the domain name, and in turn may increase or decrease the appraisal and/or valuation of the domain name itself.

In a non-limiting example embodiment, this process may be initiated by evaluating, by the precision-determining algorithm, the values assigned to the "words" and "dictionary" precision-determining elements and assigning an initial value to the Precision of the domain name. If both values are any combination of 1 and/or TRUE, indicating there is only one word in the domain name and that the domain name and/or keyword is found in the dictionary, the value of the domain name will be greater, thus the initial value of the Precision of the domain name will also be higher.

In the non-limiting example algorithm above, if the "words" and "dictionary" columns and/or data fields both have a value of 1 (or TRUE), indicating a 1-word domain name and that the 1 word is in the dictionary, the Precision of the domain name may be assigned an initial value of 500. If either of the values are not 1 (or FALSE), indicating a greater-than-one-word domain name, or that the 1 or more words are not in the dictionary, the Precision may be assigned an initial value of 0. Thus, the precision-determining algorithm may increase the initial value of the Precision of the domain name, and by extension, the appraisal and/or valuation of the domain name itself, depending on whether the "words" and "dictionary" columns and/or data fields both have a value of 1 (or TRUE, indicating a 1-word domain name and that the 1 word is in the dictionary).

The value assigned to the "words" and "dictionary" precision-determining elements may each be evaluated individually to determine the number of words in the domain name and whether the words are found in the dictionary respectively. Depending on the value assigned to these precision determining elements, the initial value assigned to the Precision of the domain name may be increased or decreased accordingly.

In the non-limiting example algorithm above, if the "words" data field has a value of 2, no change would be made to the initial value. If the value is 3, the initial value for Precision may be reduced by 100. If the value is 4, the initial value for Precision may be reduced by 500. If the value is greater than 4, the initial value for Precision may be reduced by 1000. Thus, the precision-determining algorithm may increase or decrease by degrees the Precision of the domain name, and by extension, the appraisal and/or valuation of the domain name, depending on whether the domain name has one word or more than one word respectively, single words being preferable to multiple words.

In the non-limiting example algorithm above, if the "dictionary" data field has a value of 1 (or TRUE), indicating that the domain name is found in the dictionary, the total value may be increased by 100, otherwise the total value may be decreased by 100. Thus, the precision-determining algorithm may increase or reduce the Precision of the domain name, and by extension, the appraisal and/or valuation of the domain name, depending on whether the domain name and/or keywords within the domain name are or are not words found in the dictionary respectively, words found in the dictionary being preferable.

The value assigned to the "length" precision-determining element may each be evaluated by the precision-determining algorithm to determine the length of, or number of letters in, the domain name and/or any keywords in the domain name (without the TLD or "top level domain" such as .com, .us, .net, .org etc.). In the non-limiting example algorithm above, if the "length" data field has a value of less than 3, the total value for Precision may be increased by 500. If the value is 3, the total value for Precision may be increased by 400. If the value is 4, the total value for Precision may be increased by 100. If the value is 5, the total value for Precision may be increased by 25. If the value is between 5 and 10, the total value for Precision may be neither increased nor reduced. If the value is between 11 and 15, the total value for Precision may be reduced by 50. If the value is greater than 15, the total value for Precision may be reduced by 100. Thus, the precision-determining algorithm may increase or reduce by degrees the Precision of the domain name, and by extension, the appraisal and/or valuation of the domain name, depending on the length of, or number of letters in, the domain name, lower length being preferable to high length.

The value assigned to the "numbers" precision-determining element may each be evaluated by the precision-determining algorithm to determine whether the domain name and/or keywords in the domain name contain numerals. In the non-limiting example algorithm above, if the "numbers" data field has a value of 1 (or TRUE), indicating that the domain name and/or keywords contain a numeral, the total value may be decreased by 70, otherwise the total value may be neither increased nor reduced. Thus, the precision-determining algorithm may increase or reduce the Precision of the domain name, and by extension, the appraisal and/or valuation of the domain name, depending on whether the domain name and/or keywords within the domain name contains numerals, numerals being less preferable.

Popularity, the second of the 5 P's evaluated, may include one or more popularity-determining elements. These popularity-determining elements may include various search result metrics measured by a search engine such as GOOGLE, and/or estimated searches per month as measured by a search engine optimization monitoring service and/or software such as WORDTRACKER. These popularity-determining elements may be stored in data storage 230 and assigned values used to determine the domain name's appraisal value and/or valuation.

A popularity-determining algorithm may be established, stored and/or contained within one or more software modules, possibly one or more popularity-determining software modules. Such algorithms and software modules may be stored and executed within an environment in a data center 240/250 using a server 210, client 220 and/or data storage 230, any or all of which may be communicatively coupled to a network 200.

This popularity-determining algorithm, which may be substantially similar to that demonstrated in the non-limiting example embodiment(s) below and throughout this disclosure, may assign values to the popularity-determining elements and/or may use these and/or other previously-stored popularity-determining elements to determine the popularity of the domain name, which in turn may be used to determine the appraisal value and/or valuation of the domain name.

The one or more software modules, possibly one or more popularity-determining software modules containing the popularity-determining algorithm, may be executed by a processor on a server 210, and the results may be sent through a network 200 and displayed on a user interface on a client 220.

In another non-limiting example embodiment, the elements may be stored in a local database, spreadsheet and/or any other data storage 230 on the client 220. In this embodiment, one or more software modules, possibly one or more popularity-determining software modules, software modules within a local database or spreadsheet, or any combination thereof may be used to calculate and execute the popularity-determining algorithm.

As a non-limiting example, a spreadsheet may determine the Popularity of the domain name by using any combination of software modules described above to store, calculate and execute the following popularity-determining algorithm:

$$=(((GP*0.05)+(GA*0.05)+(GT*0.2))/3000)+(WT*20)$$

In this non-limiting example, the spreadsheet may have columns, and/or data storage 230 may have a data field for each of the popularity-determining elements, and may have an additional column and/or data field to store the calculated Popularity of the domain name. In other embodiments, each of the popularity-determining elements, as well as the calculated Precision of the domain name may be calculated and/or stored in data fields in data storage 230.

The popularity-determining elements may include, but are not limited to, three possible metrics for various search results from a search engine such as GOOGLE. These elements are represented by GP, GA and GT respectively in the non-limiting example popularity-determining algorithm above. The precision-determining elements may also include, but are not limited to a metric for estimated searches per month as measured by a search engine optimization monitoring service and/or software such as WORDTRACKER.

The value assigned to the three popularity-determining elements related to search result metrics measured by a search engine may each be evaluated to determine the Popularity related to these metrics. In the non-limiting example algorithm above, these popularity-determining elements related to search result metrics measured by a search engine may be multiplied by a multiplier (the first and second elements by 0.05, and the third by 0.2), and the result of these calculations may then be summed together and divided by 3000.

The popularity-determining elements related to estimated searches per month as measured by a search engine optimization monitoring service and/or software may be multiplied by a multiplier (in this example 20), and the result of these calculations may then be summed together with the previous calculation related to search result metrics measured by a search engine. Thus, the popularity-determining algorithm may increase or reduce by degrees the Popularity of the domain name, and by extension, the appraisal and/or valuation of the domain name, depending on the results of the search result metrics measured by a search engine and a search engine optimization monitoring service and/or software.

After the popularity-determining elements are calculated and/or stored, the popularity-determining algorithm may then evaluate and use any combination of the popularity-determining elements or other disclosed elements to calculate and/or store the Popularity of the domain name. The value assigned to a particular popularity-determining element may increase or decrease the value of the Popularity of the domain name, and in turn may increase or decrease the appraisal and/or valuation of the domain name itself.

Presence, the third of the 5 P's evaluated, may include one or more presence-determining elements. These presence-determining elements may include the following: the age of the domain name and a ranking for the domain name using a domain ranking service such as ALEXA. These presence-determining elements may be stored in data storage 230 and assigned values used to determine the domain name's appraisal value and/or valuation.

A presence-determining algorithm may be established, stored and/or contained within one or more software modules, possibly one or more presence-determining software modules. Such algorithms and software modules may be stored and executed within an environment in a data center 240/250 using a server 210, client 220 and/or data storage 230, any or all of which may be communicatively coupled to a network 200.

This presence-determining algorithm, which may be substantially similar to that demonstrated in the non-limiting example embodiment(s) below and throughout this disclosure, may assign values to the presence-determining elements and/or may use these and/or other previously-stored presence-determining elements to determine the presence of the domain name, which in turn may be used to determine the appraisal value and/or valuation of the domain name.

The one or more software modules, possibly one or more presence-determining software modules containing the presence-determining algorithm, may be executed by a processor on a server 210, and the results may be sent through a network 200 and displayed on a user interface on a client 220.

In another non-limiting example embodiment, the elements may be stored in a local database, spreadsheet and/or any other data storage 230 on the client 220. In this embodiment, one or more software modules, possibly one or more presence-determining software modules, software modules within a local database or spreadsheet, or any combination thereof may be used to calculate and execute the presence-determining algorithm.

As a non-limiting example, a spreadsheet may determine the Presence of the domain name by using any combination of software modules described above to store, calculate and execute the following presence-determining algorithm:

=(IF(Age<1,−50,0)+IF(AND(Age>0,Age<3),−25,0)+IF(AND(Age>2, Age<5),0,0)+IF(AND(Age>4,Age<8),200,0)+IF(Age>7,500,0)+IF(Alexa =0,0)+IF(AND(Alexa>0,Alexa<100000),7500,0)+IF(AND(Alexa>100000, Alexa<300000),4000,0)+IF(AND(Alexa>300000,Alexa<500000),2000,0)+ IF(AND(Alexa>500000,Alexa<1000000),1000,0)+IF(AND (Alexa>1000000,Alexa<2000000),700,0)+IF(AND(Alexa>2000000, Alexa<3000000),500,0)+IF(AND(Alexa>3000000,Alexa<4000000), 200,0)+IF(AND(Alexa>4000000,Alexa<5000000),100,0)+ IF(Alexa>5000000,25,0))

In this non-limiting example, the spreadsheet may have columns, and/or data storage 230 may have a data field for each of the presence-determining elements, and may have an additional column and/or data field to store the calculated Presence of the domain name. In other embodiments, each of the presence-determining elements, as well as the calculated Presence of the domain name may be calculated and/or stored in data fields in data storage 230. The presence-determining elements may include, but are not limited to, "Age" and "Alexa"

The column and/or data field for "Age" may calculate and/or store the age of the domain name. No limitations should be placed on the time-intervals for the "Age." For example, Age could be measured in days, weeks, months, years, etc. As a non-limiting example, the age in the example algorithm above may measure the age of the domain name in years, so a 4-year-old domain name would have a number 4 calculated and/or stored in the "Age" column of the spreadsheet or data field of data storage 230.

The column and/or data field for "Alexa" may calculate and/or store the ranking for the domain name using a domain-name ranking service such as ALEXA. As a non-limiting example, a domain name with an ALEXA rank of 2,162,313 would have that number calculated and/or stored in the "Alexa" column of the spreadsheet or data field of data storage 230.

After the presence-determining elements are calculated and/or stored, the presence-determining algorithm may then evaluate and use any combination of the presence-determining elements or other disclosed elements to calculate and/or store the Presence of the domain name. The value assigned to a particular presence-determining element may increase or decrease the value of the Presence of the domain name, and in turn may increase or decrease the appraisal and/or valuation of the domain name itself.

The value assigned to the "Age" presence-determining element may each be evaluated to determine the age of the domain name. In the non-limiting example algorithm above, if the "Age" data field has a value of less than 3, the total value for Presence may be reduced by 25. If the value is between 3 and 4, the total value for Presence may be neither increased nor decreased. If the value is between 5 and 7, the total value for Presence may be increased by 200. If the value is greater than 7, the total value for Precision may be increased by 500. Thus, the presence-determining algorithm may increase or reduce by degrees the Presence of the domain name, and by extension, the appraisal and/or valuation of the domain name, depending on the age of the domain name, higher age being preferable to lower age.

The value assigned to the "Alexa" presence-determining element may each be evaluated to determine the rank of the domain name according to a domain-name ranking service such as ALEXA. In the non-limiting example algorithm above, if the "Alexa" data field has a value of between 0 and 100000, the total value for Presence may be increased by 7500. If the "Alexa" data field has a value of between 100000 and 300000, the total value for Presence may be increased by 4000. If the "Alexa" data field has a value of between 300000 and 500000, the total value for Presence may be increased by 2000. If the "Alexa" data field has a value of between 500000 and 1000000, the total value for Presence may be increased by 1000. If the "Alexa" data field has a value of between 1000000 and 2000000, the total value for Presence may be increased by 700. If the "Alexa" data field has a value of between 2000000 and 3000000, the total value for Presence may be increased by 500. If the "Alexa" data field has a value of between 3000000 and 4000000, the total value for Presence may be increased by 200. If the "Alexa" data field has a value of between 4000000 and 5000000, the total value for Presence may be increased by 100. If the "Alexa" data field has a value greater than 5000000, the total value for Presence may be increased by 25. Thus, the presence-determining algorithm may increase the Presence of the domain name, and by extension, the appraisal and/or valuation of the domain name, depending on the ranking of the domain name.

Pattern, the fourth of the 5 P's evaluated, may include one or more pattern-determining elements. These pattern-determining elements may include the following: the number of premium characters found in the domain name, the part of speech found in the domain name (possibly evaluating if the part of speech is only one word) and the vowel-consonant relationship of the domain name (possibly evaluating whether the domain name is limited to 4 or 5 characters). These pattern-determining elements may be stored in data storage 230 and assigned values used to determine the domain name's appraisal value and/or valuation.

A pattern-determining algorithm may be established, stored and/or contained within one or more software modules, possibly one or more pattern-determining software modules. Such algorithms and software modules may be stored and executed within an environment in a data center 240/250 using a server 210, client 220 and/or data storage 230, any or all of which may be communicatively coupled to a network 200.

This pattern-determining algorithm, which may be substantially similar to that demonstrated in the non-limiting example embodiment(s) below and throughout this disclosure, may assign values to the pattern-determining elements and/or may use these and/or other previously-stored pattern-determining elements to determine the pattern of the domain name, which in turn may be used to determine the appraisal value and/or valuation of the domain name.

The one or more software modules, possibly one or more pattern-determining software modules containing the pattern-determining algorithm, may be executed by a processor on a server 210, and the results may be sent through a network 200 and displayed on a user interface on a client 220.

In another non-limiting example embodiment, the elements may be stored in a local database, spreadsheet and/or any other data storage 230 on the client 220. In this embodiment, one or more software modules, possibly one or more pattern-determining software modules, software modules within a local database or spreadsheet, or any combination thereof may be used to calculate and execute the pattern-determining algorithm.

As a non-limiting example, a spreadsheet may determine the Pattern of the domain name by using any combination of software modules described above to store, calculate and execute the following pattern-determining algorithm:

```
=IF(VCVCV=1,10,0)+IF(CVCVC=1,15,0)+
IF(CVCV=1,20,0)+IF(VCVC=1,18,0)+IF(VCCV=1,10,0)+
IF(CVVC=1,10,0)+IF(prem100=1,15,0)+IF(prem75=1,10,0)+
IF(prem50=1,0,0)+IF(prem0=1,-15,0)+IF(Noun=1,1500,0)+
IF(PluralNoun=1,2000,0)
```

In this non-limiting example, the spreadsheet may have columns, and/or data storage 230 may have a data field for each of the pattern-determining elements, and may have an additional column and/or data field to store the calculated Pattern of the domain name. In other embodiments, each of the pattern-determining elements, as well as the calculated Pattern of the domain name may be calculated and/or stored in data fields in data storage 230. The pattern-determining elements may include, but are not limited to, "VCVCV" (indicating a pattern of vowel, consonant, vowel, consonant, vowel), "CVCVC" (indicating a pattern of consonant, vowel, consonant, vowel, consonant), "CVCV" (indicating a pattern of consonant, vowel, consonant, vowel), "VCVC" (indicating a pattern of vowel, consonant, vowel, consonant), "VCCV" (indicating a pattern of vowel, consonant, consonant, vowel), "CVVC" (indicating a pattern of consonant, vowel, vowel, consonant), "100% Prem," "75-99% Prem," "50-75% Prem," "0-50% Prem," "Noun," "Plural Noun," "Verb," "Adjective," etc.

The column and/or data fields for the vowel and consonant pattern-determining elements (including VCVCV, CVCVC, CVCV, VCVC, VCCV and CVVC in the non-limiting example elements above) may calculate and/or store a determination of whether the domain name and/or keywords in the domain name contain a corresponding pattern of vowels and consonants. This determination can be calculated and/or stored as a TRUE/FALSE value, or possibly numerically as a 1 or 0. In other non-limiting embodiments, the actual pattern of vowels and consonants may be calculated and/or stored in the data fields.

As non-limiting examples urir.com may be found to have the vowel and consonant pattern of VCVC, and thus would have a number 1 or a value of TRUE calculated and/or stored in the "VCVC" column of the spreadsheet and/or data field of data storage 230, while fuel.net would have a number 1 or a value of TRUE calculated and/or stored in the "CVVC" column of the spreadsheet or data field of data storage 230.

The column and/or data fields for the premium characters pattern-determining elements (including prem100, prem75, prem50 and prem0 in the non-limiting example elements above) may calculate and/or store a determination of whether the domain name and/or keywords in the domain name contain a corresponding pattern of premium characters. This determination can be calculated and/or stored as a TRUE/FALSE value, or possibly numerically as a 1 or 0. In other non-limiting embodiments, the actual pattern of premium characters may be calculated and/or stored in the data fields.

As non-limiting examples planets.com may be found to have 100% of the premium characters (corresponding to prem100), and thus would have a number 1 or a value of TRUE calculated and/or stored in the "100% Prem" column of the spreadsheet and/or data field of data storage 230. Witchcraft.com, whatever.com and guns.com may be found to have between 75% and 99% of the premium characters (corresponding to prem75), and thus would have a number 1 or a value of TRUE calculated and/or stored in the "75-99% Prem" column of the spreadsheet or data field of data storage 230. 12steps.com may be found to have between 50% and 75% of the premium characters (corresponding to prem50), and thus would have a number 1 or a value of TRUE calculated and/or stored in the "50-75% Prem" column of the spreadsheet or data field of data storage 230. A similar logic may be applied for prem0 and the "0-50% Prem" column of the spreadsheet or data field of data storage 230.

The column and/or data fields for the part of speech pattern-determining elements (including Noun, PluralNoun, etc. in the non-limiting example elements above) may calculate and/or store a determination of whether the domain name and/or keywords in the domain name contain a corresponding pattern of the part of speech found. This determination can be calculated and/or stored as a TRUE/FALSE value, or possibly numerically as a 1 or 0. In other non-limiting embodiments, the actual part of speech may be calculated and/or stored in the data fields.

As non-limiting examples witchcraft.com may each be found to be a Noun, and thus would have a number 1 or a value of TRUE calculated and/or stored in the "Noun" column of the spreadsheet and/or data field of data storage 230. Planets.com and guns.com may each be found to be a Plural Noun, and thus would have a number 1 or a value of TRUE calculated and/or stored in the "Plural Noun" column of the spreadsheet or data field of data storage 230.

After the pattern-determining elements are calculated and/or stored, the pattern-determining algorithm may then evaluate and use any combination of the pattern-determining elements or other disclosed elements to calculate and/or store the Pattern of the domain name. The value assigned to a particular pattern-determining element may increase or decrease the value of the Pattern of the domain name, and in turn may increase or decrease the appraisal and/or valuation of the domain name itself.

The value assigned to the vowel and consonant pattern-determining elements (including VCVCV, CVCVC, CVCV, VCVC, VCCV and CVVC in the non-limiting example elements above) may each be evaluated to determine whether the domain name and/or keywords in the domain name contain the corresponding pattern of vowels and consonants.

In the non-limiting example algorithm above, if the corresponding vowel and consonant data field has a value of 1 (or TRUE), indicating that the domain name and/or keywords contain that particular pattern of vowels and consonants, the total value may be increased (by 10, 15, 20, 18, 10 or 10 respectively, in this example), otherwise the total value may be neither increased nor reduced. Thus, the pattern-determining algorithm may increase the Pattern of the domain name, and by extension, the appraisal and/or valuation of the domain name, depending on whether the domain name and/or keywords within the domain name contain the corresponding vowel and consonant pattern-determining elements, with certain patterns being preferable.

The value assigned to the percentage of premium characters pattern-determining elements (including prem100, prem75, prem50 and prem0 in the non-limiting example elements above) may each be evaluated to determine whether the domain name and/or keywords in the domain name contain the corresponding percentage of premium characters within the pattern.

In the non-limiting example algorithm above, if the corresponding percentage of premium characters data field has a value of 1 (or TRUE), indicating that the domain name and/or keywords contain that particular percentage of premium characters, the total value may be increased or reduced by degrees (by 15, 10, 0 or −15 respectively, in this example), otherwise the total value may be neither increased nor reduced. Thus, the pattern-determining algorithm may increase or reduce the Pattern of the domain name, and by extension, the appraisal and/or valuation of the domain name, depending on whether the domain name and/or keywords within the domain name contain a corresponding percentage of premium characters pattern-determining elements, with higher percentages of premium characters being preferable.

The value assigned to the part of speech pattern-determining elements (including Noun, PluralNoun, etc. in the non-limiting example elements above) may each be evaluated to determine whether the domain name and/or keywords in the domain name contain the corresponding part of speech within the pattern.

In the non-limiting example algorithm above, if the corresponding part of speech data field has a value of 1 (or TRUE), indicating that the domain name and/or keywords contain that particular part of speech, the total value may be increased (by 1500 or 2000 respectively, in this example), otherwise the total value may be neither increased nor reduced. Thus, the pattern-determining algorithm may increase the Pattern of the domain name, and by extension, the appraisal and/or valuation of the domain name, depending on whether the domain name and/or keywords within the domain name contain corresponding part of speech pattern-determining elements, with recognized parts of speech being preferable.

Pay-per-click or PPC, the fifth of the 5 P's evaluated, may include one or more PPC-determining elements. These PPC-determining elements may include various pay-per-click bid metrics measured by a service and/or software such as ADWORDS and/or the number of ads returned as measured by a search engine such as GOOGLE. These PPC-determining elements may be stored in data storage 230 and assigned values used to determine the domain name's appraisal value and/or valuation.

A PPC-determining algorithm may be established, stored and/or contained within one or more software modules, possibly one or more PPC-determining software modules. Such algorithms and software modules may be stored and executed within an environment in a data center 240/250 using a server 210, client 220 and/or data storage 230, any or all of which may be communicatively coupled to a network 200.

This PPC-determining algorithm, which may be substantially similar to that demonstrated in the non-limiting example embodiment(s) below and throughout this disclosure, may assign values to the PPC-determining elements and/or may use these and/or other previously-stored PPC-determining elements to determine the PPC of the domain name, which in turn may be used to determine the appraisal value and/or valuation of the domain name.

The one or more software modules, possibly one or more PPC-determining software modules containing the PPC-determining algorithm, may be executed by a processor on a server 210, and the results may be sent through a network 200 and displayed on a user interface on a client 220.

In another non-limiting example embodiment, the elements may be stored in a local database, spreadsheet and/or any other data storage 230 on the client 220. In this embodiment, one or more software modules, possibly one or more PPC-determining software modules, software modules within a local database or spreadsheet, or any combination thereof may be used to calculate and execute the PPC-determining algorithm.

As a non-limiting example, a spreadsheet may determine the PPC of the domain name by using any combination of software modules described above to store, calculate and execute the following PPC-determining algorithm:

```
=(PPCBid*100)+(Ads*50)
```

In this non-limiting example, the spreadsheet may have columns, and/or data storage 230 may have a data field for each of the PPC-determining elements, and may have an additional column and/or data field to store the calculated PPC of the domain name. In other embodiments, each of the PPC-determining elements, as well as the calculated PPC of the domain name may be calculated and/or stored in data fields in data storage 230.

The PPC-determining elements may include, but are not limited to, metrics for various pay-per-click bid metrics measured by a service and/or software such as ADWORDS, and/or The PPC-determining elements may also include, but are not limited to a metric for the number of ads returned as measured by a search engine such as GOOGLE.

The value assigned to the various pay-per-click bid metrics measured by a service may each be evaluated to determine the PPC related to these metrics. In the non-limiting example algorithm above, these PPC-determining elements related to various pay-per-click bid metrics may be multiplied by a multiplier (in this example 100).

The PPC-determining elements related to the number of ads returned as measured by a search engine may also be multiplied by a multiplier (in this example 50), and the result of this calculation may then be summed together with the previous calculation related to various pay-per-click bid metrics measured by a service and/or software. Thus, the PPC-determining algorithm may increase or reduce the PPC of the domain name, and by extension, the appraisal and/or valuation of the domain name, depending on the results of the various pay-per-click bid metrics measured by a service and/or the number of ads returned as measured by a search engine.

After the PPC-determining elements are calculated and/or stored, the PPC-determining algorithm may then evaluate and use any combination of the PPC-determining elements or other disclosed elements to calculate and/or store the PPC of the domain name. The value assigned to a particular PPC-determining element may increase or decrease the value of the PPC of the domain name, and in turn may increase or decrease the appraisal and/or valuation of the domain name itself.

Valuation, determined by the elements below, as well as the 5 P's evaluated and their respective elements, may also include one or more valuation-determining elements. These valuation-determining elements, possibly used in conjunction with the 5 P's evaluated, as well as each of the respective elements used to determine them, may include the following: The domain name separate from the TLD, the TLD associated with the domain name, the availability of the domain name with a .com TLD, a multiplier for the domain name's TLD, a determination of whether or not the domain name contains dashes, as well as the number of dashes, if any, found in the domain name and a multiplier adjusted for domain names containing dashes. These valuation-determining elements may be stored in data storage 230 and assigned values used to determine the domain name's appraisal value and/or valuation.

A valuation-determining algorithm may be established, stored and/or contained within one or more software modules, possibly one or more valuation-determining software modules. Such algorithms and software modules may be stored and executed within an environment in a data center 240/250 using a server 210, client 220 and/or data storage 230, any or all of which may be communicatively coupled to a network 200.

This valuation-determining algorithm, which may be substantially similar to that demonstrated in the non-limiting example embodiment(s) below and throughout this disclosure, may assign values to the valuation-determining elements and/or may use these and/or other previously-stored valuation-determining elements to determine the valuation of the domain name, which in turn may be used to determine the appraisal value of the domain name.

The one or more software modules, possibly one or more valuation-determining software modules containing the valuation-determining algorithm, may be executed by a processor on a server 210, and the results may be sent through a network 200 and displayed on a user interface on a client 220.

In another non-limiting example embodiment, the elements may be stored in a local database, spreadsheet and/or any other data storage 230 on the client 220. In this embodiment, one or more software modules, possibly one or more valuation-determining software modules, software modules within a local database or spreadsheet, or any combination thereof may be used to calculate and execute the valuation-determining algorithm.

As a non-limiting example, a spreadsheet may determine the Valuation of the domain name by using any combination of software modules described above to store, calculate and execute the following valuation-determining algorithm:

```
=IF(IF(AND(Popularity<15,com_available=1),0,
SUM(Precision:PPC)*(IF(AND(words=1,WT>250),25,
IF(WT>250,15,6))*tld_multiplier*dash_multiplier))<10,0,
IF(AND(Popularity<15,com_available=1),0,
SUM(Precision:PPC)*(IF(AND(words=1,WT>250),25,
IF(WT>250,15,6))*tld_multiplier*dash_multiplier)))
```

In this non-limiting example, the spreadsheet may have columns, and/or data storage 230 may have a data field for each of the valuation-determining elements, and may have an additional column and/or data field to store the calculated Valuation of the domain name. In other embodiments, each of the valuation-determining elements, as well as the calculated Valuation of the domain name may be calculated and/or stored in data fields in data storage 230. The valuation-determining elements may include, but are not limited to, "Domain," "TLD," "com_available," "tld_multiplier," "dashes" and "dash_multiplier."

The column and/or data field for "Domain" may calculate and/or store a determination of the domain name without its associated TLD. As non-limiting examples planets.com, guns.com, whatever.com and witchcraft.com would have "planets," "guns," "whatever" and "witchcraft" calculated and/or stored in the "Domain" column of the spreadsheet and/or data field of data storage 230 respectively.

The column and/or data field for "TLD" may calculate and/or store a determination of the top level domain associated with the domain name. As non-limiting examples planets.com, guns.com, whatever.com and witchcraft.com would all have "com" calculated and/or stored in the "TLD" column of the spreadsheet and/or data field of data storage 230 respectively.

The column and/or data field for "com_available" may calculate and/or store a determination of whether the .com TLD for a particular domain name is available. This determination can be calculated and/or stored as a TRUE/FALSE value, or possibly numerically as a 1 or 0. As non-limiting examples onlinelampguide.com and finnishfelines.com may both be domain names available with a .com TLD, and thus would have a number 1 or a value of TRUE calculated and/or stored in the "com_available" column of the spreadsheet and/or data field of data storage 230, while the other domain names listed above would have a number 0 or a value of FALSE calculated and/or stored in the "com_available" column of the spreadsheet and/or data field of data storage 230.

The column and/or data field for "tld_multiplier" may calculate and/or store a multiplier based on the TLD associated with the domain name. In one non-limiting example embodiment, this multiplier will always be less than 1 for TLDs other than .com. A non-limiting example formula or algorithm may be used to determine the multiplier as follows:

```
=IF(tld="com",1,IF(tld="org",0.08,IF(tld="net",0.1,
    IF(tld="ca",0.12,IF(tld="us",0.015)))))
```

Thus, if the TLD stored in the TLD column and/or data field is "com", then a value of 1 may be calculated and/or stored in the "tld_multiplier" column of the spreadsheet and/or data field of data storage 230. If the TLD stored in the TLD column is "org", then a value of 0.08 may be calculated and/or stored in the "tld_multiplier" column of the spreadsheet and/or data field of data storage 230. If the TLD stored in the TLD column is "net", then a value of 0.1 may be calculated and/or stored in the "tld_multiplier" column of the spreadsheet and/or data field of data storage 230. If the TLD stored in the TLD column is "ca", then a value of 0.12 may be calculated and/or stored in the "tld_multiplier" column of the spreadsheet and/or data field of data storage 230. If the TLD stored in the TLD column is "us", then a value of 0.15 may be calculated and/or stored in the "tld_multiplier" column of the spreadsheet and/or data field of data storage 230.

As non-limiting examples masks.org would have a value of 0.08 calculated and/or stored in the "tld_multiplier" column of the spreadsheet and/or data field of data storage 230, fuel.net would have a value of 0.1 calculated and/or stored in the "tld_multiplier" column of the spreadsheet and/or data field of data storage 230, america.us would have a value of 0.015 calculated and/or stored in the "tld_multiplier" column of the spreadsheet and/or data field of data storage 230, while the other domain names listed above would have a value of 1 calculated and/or stored in the "tld_multiplier" column of the spreadsheet and/or data field of data storage 230.

No limitations should be placed on how the multiplier for a particular domain name is determined. As a non limiting example, to come up with the value of that same domain name for other TLDs, a multiplier may be based on comparable sales or sometimes simply intuition. In one non-limiting example embodiment, a dynamic multiplier may be created based on registration statistics per each TLD. This embodiment may give a very accurate measure of domain scarcity, thus indicating for domain name appraisal purposes relatively how rare a domain is. When doing this domain evaluation the standard may be to evaluate a name for the .com TLD and then apply a multiplier (always less than 1) to come up with the value of that same name in other TLDs. In another embodiment, the .com top level domain may be used as a baseline multiplier and each additional top level domain may be assigned a multiplier less than the baseline multiplier, but proportional to the number of registrations for that top level domain name in comparison to .com domains.

As non-limiting examples, using the embodiment using the registration statistics per each TLD, the registrations may use registration data to determine the following example registration statistics: COM—80,451,101, NET—12,227,350, ORG—7,541,738, INFO—5,134,461, BIZ—2,014,553, US—1,557,592, MOBI—836,345. Using these statistics, the following multipliers may be determined by comparing the proportional registrations of other TLDs to.com TLD registrations: com=1, net=0.15, org=0.09, info=0.06, biz=0.02, us=0.01, mobi=0.009. It should be noted that the dynamic top level domain multiplier in this example is based on registration statistics for each of a plurality of top level domains, .com top level domains being assigned a multiplier of 1 and each additional top level domain being assigned a multiplier of less than 1 proportional to the number of registrations for that top level domain name as compared to the .com domains.

Thus, using the example multipliers based on registration statistics, the following example appraisals may be made (possibly using a software module executed on a server and configured to create and apply a top level domain multiplier comprising registration statistics) based on the multiplier for the domain "play": play.com=$100,000, play.net=$15,000, play.org=$9,000, play.info=$6,000, play.biz=$2,000, play.us=$1,000, play.mobi=$900. These figures may be calculated by applying the top level domain multiplier to the certified domain name appraisal process by multiplying the dynamic top level domain multiplier by the appraisal and/or valuation of the domain name.

The column and/or data field for "dashes" may calculate and/or store a determination of whether the domain name and/or any keywords in the domain name contain dashes. This determination can be calculated and/or stored as a TRUE/FALSE value, or possibly numerically as a 1 or 0. As non-limiting examples any-cell.com contains dashes, and thus would have a number 1 or a value of TRUE calculated and/or stored in the "dashes" column of the spreadsheet and/or data field of data storage 230, while the other domain names listed above would have a number 0 or a value of FALSE calculated and/or stored in the "dashes" column of the spreadsheet and/or data field of data storage 230.

The column and/or data field for "dash_multiplier" may calculate and/or store a multiplier based on whether the domain name contains dashes, as determined by the "dashes" column and/or data field. A non-limiting example formula or algorithm may be used to determine the multiplier as follows:

```
=IF(dashes=0,1,IF(dashes=(words-1),0.1,0.01))
```

Thus, if the value stored in the dashes column and/or data field is 0 (or FALSE), then a value of 1 may be calculated and/or stored in the "dash_multiplier" column of the spreadsheet and/or data field of data storage 230. If the total of 1 minus the value in the "words" column and/or data field (previously disclosed) is the same as the value stored in the "dashes" column or data field, then a value of 0.1 may be calculated and/or stored in the "dash_multiplier" column of the spreadsheet and/or data field of data storage 230, otherwise, a value of 0.01 may be calculated and/or stored in the "dash_multiplier" column of the spreadsheet and/or data field of data storage 230.

As non-limiting examples any-cell.com would have a value of 0.1 calculated and/or stored in the "dash_multiplier" column of the spreadsheet and/or data field of data storage 230, while the other domain names listed above would have a value of 1 calculated and/or stored in the "dash_multiplier" column of the spreadsheet and/or data field of data storage 230.

After the valuation-determining elements are calculated and/or stored, the valuation-determining algorithm may then evaluate and use any combination of the valuation-determining elements or other disclosed elements to calculate and/or store the Valuation of the domain name. The value assigned to a particular valuation-determining element may increase or decrease the value of the Valuation of the domain name, and in turn may increase or decrease the appraisal of the domain name itself.

```
=IF(IF(AND(Popularity<15,com__available=1),0,
SUM(Precision:PPC)*(IF(AND(words=1,WT>250),25,
IF(WT>250,15,6))*tld__multiplier*dash__multiplier))<10,0,
IF(AND(Popularity<15,com__available=1),0,
SUM(Precision:PPC)*(IF(AND(words=1,WT>250),25,IF(WT>250,15,
6))*tld__multiplier*dash__multiplier)))
```

To fully understand this example algorithm, it is important to break the algorithm into smaller component parts. A smaller example algorithm is being evaluated to determine if it is less than or greater than 10. If the result of this smaller example algorithm is less than 10, the value of the Valuation is 0, otherwise the value of the Valuation is the result of the smaller example algorithm. The smaller algorithm is as follows:

```
IF(AND(Popularity<15,com__available=1),0,
SUM(Precision:PPC)*(IF(AND(words=1,WT>250),25,IF(WT>250,15,
6))*tld__multiplier*dash__multiplier))
```

The value assigned to the "Popularity" valuation-determining element (itself calculated using the popularity-determining elements) may be evaluated by the valuation-determining algorithm to determine the value assigned to the popularity of the domain name. The value assigned to the "com_available" valuation-determining element may also be evaluated by the valuation-determining algorithm to determine whether the .com TLD for a particular domain name is available. In the non-limiting example algorithm above, if the "Popularity" data field has a value of less than 15, and the com_available data field has a value of 1 (or TRUE), the total value of the smaller example algorithm may be assigned a value of 0, which would in turn cause the Valuation of the domain name to be 0, since the result of the smaller example algorithm is less than 10. Thus, the valuation-determining algorithm may increase or reduce the Valuation of the domain name, and by extension, the appraisal of the domain name, depending on whether the Popularity valuation-determining element is greater than 15 and whether the .com TLD for the domain name is available, Popularity greater than 15 and non-available .com domain names being preferable.

If the Popularity of the domain name is greater than 15 and/or the .com TLD for the domain name is not available, the total value of the smaller example algorithm may be determined by multiplying 4 multiplicands. Again, it is helpful to break this smaller example algorithm into smaller component parts to better understand it. In the smaller example algorithm, the first multiplicand is the sum of the Precision and the PPC valuation-determining elements.

The second multiplicand is determined by evaluating the following formula/algorithm: IF(AND(words=1,WT>250), 25,IF(WT>250,15,6) In this formula/algorithm, the value assigned to the words valuation-determining element may be evaluated to determine whether the value is 1. The value assigned to the metric for estimated searches per month (WT in the example algorithm) may also be evaluated to determine if the value is greater than 250. If the words element value is 1 and the estimated searches per month value is greater than 250, then the value assigned to the second multiplicand would be 25, otherwise, the value assigned to the second multiplicand would be determined by again evaluating the value assigned to the metric for the estimated searches per month (WT in this example).

If this value is greater than 250, the value assigned to the second multiplicand would be 15; otherwise the value assigned to the second multiplicand would be 6. The third and fourth multiplicands are the values of the valuation-determining elements calculated and/or stored in the tld_multiplier and dash_multiplier columns and/or data fields respectively.

As non-limiting examples and using the algorithms described in detail above, planets.com may be found to have a Precision, Popularity, Presence, Pattern and PPC of 600, 22877, 1000, 2015 and 241 respectively. Using the formulas above, planets.com would have a Valuation of $668,320.00.

FIG. 8 shows an example interface using the disclosed structure that may be used for displaying the progress of the domain spinning to allow the domain names to be displayed to the user. Likewise, FIG. 8 shows the appraisal and/or valuation of the domain name which may be displayed to a user on a user interface on a client.

The additional steps included in the embodiments illustrated in FIG. 1-8 are not limited to the embodiment shown in FIG. 1, FIG. 7, or their respective illustrated embodiments, and may be combined in several different orders and modified within multiple other disclosed embodiments. Likewise, the method steps disclosed herein may be accomplished by a software module executed on a server and/or client configured to accomplish that method step.

Other embodiments and uses of the above inventions will be apparent to those having ordinary skill in the art upon consideration of the specification and practice of the invention disclosed herein. The specification and examples given should be considered exemplary only, and it is contemplated that the appended claims will cover any other such embodiments or modifications as fall within the true scope of the invention.

The Abstract accompanying this specification is provided to enable the United States Patent and Trademark Office and the public generally to determine quickly from a cursory inspection the nature and gist of the technical disclosure and in no way intended for defining, determining, or limiting the present invention or any of its embodiments.

The invention claimed is:

1. A method comprising:

A) receiving, by one or more server computers communicatively coupled to a network, a domain name comprising a domain name text string and a top level domain;

B) calculating, by one or more server computers communicatively coupled to a network, an appraisal value for said domain name, said appraisal value increasing or decreasing responsive to one or more variances in:

i) a precision value;

ii) a popularity value;

iii) a presence value;

iv) a pattern value; and v) a pay-per-click value;

C) determining, by said one or more server computers, whether said top level domain comprises a .com top level domain;

D) responsive to a determination that:

i) said top level domain comprises said .com top level domain, assigning, by said one or more server computers, a value of 1 to a domain scarcity multiplier;

ii) said top level domain does not comprise said .com top level domain, calculating, by said one or more server computers:

a) a first sum of one or more domain name registrations for said top level domain;

b) a second sum of one or more .com domain name registrations;

c) said domain scarcity multiplier comprising a decimal value calculated according to said first sum divided by said second sum;

E) calculating, by said one or more server computers, a revised appraisal value for said domain name according to said appraisal value being multiplied by said domain scarcity multiplier; and F) transmitting, by said one or more server computers, said revised appraisal value to a client computer communicatively coupled to said network.

2. The method of claim 1, further comprising the step of calculating, by said one or more server computers, said precision value for said domain name by:

i) parsing one or more text strings from said domain name text string;

ii) generating a keyword value comprising a numeric value for a quantity of said one or more text strings parsed from said domain name text string;

iii) searching an electronic dictionary in a database communicatively coupled to said network for said one or more text strings;

iv) generating a dictionary value comprising a true or false value reflecting whether one or more of said one or more text strings are found in said electronic dictionary;

v) generating a length value comprising a number of characters in said domain name text string; and vi) generating a numerals value comprising a true or false value reflecting whether one or more numerals are found in said domain name text string.

3. The method of claim 2, further comprising the step of calculating, by said one or more server computers, said precision value for said domain name by:

i) initializing said precision value to 0;

ii) determining whether:

a) said keyword value is above or below a predetermined keyword threshold value;

b) said dictionary value comprises said true value or said false value;

c) said length value is above or below a predetermined length threshold value; and d) said numerals value comprises said true value or said false value;

iii) responsive to a determination that said keyword value is above said predetermined keyword threshold value, said dictionary value comprises said true value, said length value is below said predetermined length threshold value or said numerals value comprises said false value, increasing said precision value; and iv) responsive to a determination that said keyword value is below said predetermined keyword threshold value, said dictionary value comprises a false value, said length value is above said predetermined length threshold value or said numerals value comprises a true value, decreasing said precision value.

4. The method of claim 2, further comprising the steps of:

i) writing, by said one or more server computers, said keyword value to a keyword data field in a record for said domain name stored in said database;

ii) writing, by said one or more server computers, said dictionary value to a dictionary data field in said record;

iii) writing, by said one or more server computers, said length value to a length data field in said record;

iv) writing, by said one or more server computers, said numerals value to a numerals data field in said record; and v) writing, by said one or more server computers, said precision value to a precision data field in said record.

5. The method of claim 1, further comprising the step of calculating, by said one or more server computers, said popularity value for said domain name by:

i) receiving, from one or more search engines, one or more search result metrics measured by said one or more search engines;

ii) generating a search engine metrics value comprising said one or more search result metrics;

iii) receiving, from one or more search engine optimization monitoring services or software, one or more search tracking metrics tracking, at regular intervals, an estimated number of searches of a plurality of words via said one or more search engine optimization monitoring services or software; and iv) generating a search tracking metrics value comprising said one or more search tracking metrics.

6. The method of claim 5, further comprising the steps of calculating, by said one or more server computers, said popularity value for said domain name by:

i) initializing said popularity value to 0;

ii) determining whether:

a) said one or more search engine metrics comprise one or more positive or one or more negative search engines metrics; and b) said one or more search tracking metrics comprise one or more high or one or more low estimated searches per month;

iii) responsive to a determination that said one or more search engine metrics comprise said one or more positive search engines metrics or said one or more search tracking metrics comprise said one or more high estimated searches per month, increasing said popularity value; and iv) responsive to a determination that said one or more search engine metrics comprise said one or more negative search engines metrics or said one or more search tracking metrics comprise said one or more low estimated searches per month, decreasing said popularity value.

7. The method of claim 5, further comprising the steps of:

i) writing, by said one or more server computers, said search engine metrics value to a search engine metrics data field in a record for said domain name stored in a database communicatively coupled to said network;

ii) writing, by said one or more server computers, said search tracking metrics value to a search tracking metrics data field in said record; and iii) writing, by said one or more server computers, said popularity value to a popularity data field in said record.

8. The method of claim 1, further comprising the step of calculating, by said one or more server computers, said presence value for said domain name by:

i) identifying a registration date for said domain name;

ii) generating an age value comprising an age, in regular numeric time intervals, of said domain name, said age being determined by comparing a current date with said registration date;

iii) receiving, from one or more domain name ranking services or software, a domain rank for said domain name; and iv) generating a domain rank value comprising said domain rank.

9. The method of claim 8, further comprising the step of calculating, by said one or more server computers, said presence value for said domain name by:

i) initializing said presence value to 0;

ii) determining whether:

a) said age value is above or below a predetermined age threshold value; and b) said domain rank value is above or below a predetermined domain rank threshold value;

iii) responsive to a determination that said age value is above said predetermined age threshold value or said domain rank value is above said predetermined domain rank threshold value, increasing said presence value; and iv) responsive to a determination that said age value is below said predetermined age threshold value or said domain rank value is below said predetermined domain rank threshold value, decreasing said presence value.

10. The method of claim 8, further comprising the steps of:

i) writing, by said one or more server computers, said age value to an age data field in a record for said domain name stored in a database communicatively coupled to said network;

ii) writing, by said one or more server computers, said domain rank value to a domain rank data field in said record; and iii) writing, by said one or more server computers, said presence value to a presence data field in said record.

11. The method of claim 1, further comprising the step of calculating, by said one or more server computers, said pattern value for said domain name by:

i) identifying one or more characters as one or more premium characters;

ii) generating a premium characters value comprising a percentage of said one or more premium characters in said domain name;

iii) identifying one or more parts of speech;

iv) generating a part of speech value comprising a true or false value reflecting whether said one or more parts of speech are represented in said domain name;

v) identifying one or more patterns of relationships between one or more vowels and one or more consonants in said domain name; and vi) generating a vowel consonant relationship value comprising a true or false value reflecting whether said one or more patterns of relationships between said one or more vowels and said one or more consonants are represented in said domain name.

12. The method of claim 11, further comprising the step of calculating, by said one or more server computers, said pattern value for said domain name by:

i) initializing said pattern value to 0;

ii) determining whether:

a) said premium characters value is above or below a predetermined premium characters threshold value;

b) said parts of speech value comprises said true value or said false value; and c) said vowel consonant relationship value comprises said true value or said false value;

iii) responsive to a determination that said premium characters value is above said predetermined premium characters threshold value, said parts of speech value comprises said true value or said vowel consonant relationship value comprises said true value, increasing said pattern value; and iv) responsive to a determination that said premium characters value is below said predetermined premium characters threshold value, said parts of speech value comprises said false value or said vowel consonant relationship value comprises said false value, decreasing said pattern value.

13. The method of claim 11, further comprising the steps of:

i) writing, by said one or more server computers, said premium characters value to a premium characters data field in a record for said domain name stored in a database communicatively coupled to said network;

ii) writing, by said one or more server computers, said part of speech value to a part of speech data field in said record;

iii) writing, by said one or more server computers, said vowel consonant relationship value to a vowel consonant relationship data field in said record; and iv) writing, by said one or more server computers said pattern value to a presence data field in said record.

14. The method of claim 1, further comprising the step of calculating, by said one or more server computers, said pay-per-click value for said domain name by:

i) receiving, from one or more pay-per-click bid metrics services or software, one or more pay-per-click bid metrics for said domain name;

ii) generating a bid metric value comprising said one or more pay-per-click bid metrics;

iii) receiving, from one or more search engines, a number of ads returned for said domain name as measured by said one or more search engines; and iv) generating a returned ads value comprising said number of ads returned for said domain name.

15. The method of claim 14, further comprising the step of calculating, by said one or more server computers, said pay-per-click value for said domain name by:

i) initializing said pay-per-click value to 0;

ii) determining whether:

a) said bid metric value is above or below a predetermined bid metric threshold value; and b) said returned ads value is above or below a predetermined returned ads threshold value;

iii) responsive to a determination that said bid metric value is above said predetermined bid metric threshold value or said returned ads value is above said predetermined returned ads threshold value, increasing said pay-per-click value; and iv) responsive to a determination that said bid metric value is below said predetermined bid metric threshold value or said returned ads value is below said predetermined returned ads threshold value, decreasing said pay-per-click value.

16. The method of claim 14, further comprising the steps of:

i) writing, by said one or more server computers, said bid metric value to a bid metric data field in a record for said domain name stored in a database communicatively coupled to said network;

ii) writing, by said one or more server computers, said returned ads value to a returned ads data field in said record; and iii) writing, by said one or more server computers, said pay-per-click value to a pay-per-click data field in said record.

17. The method of claim 1, further comprising the step of determining, by said one or more server computers, whether said domain name text string comprises one or more dashes and, responsive to a determination that said domain name text string comprises said one or more dashes, calculating a dashes multiplier wherein said dashes multiplier is less than 1, wherein said revised appraisal value is calculated according to the following formula: said revised appraisal value=(said appraisal value)*(said domain scarcity multiplier)*(said dashes multiplier).

18. The method of claim 17, further comprising the steps of writing to a database communicatively coupled to said network, said appraisal value, said dashes multiplier, said domain scarcity multiplier, and/or said revised appraisal value in association with said domain name.

19. The method of claim 1, further comprising the steps of:

F) receiving, by said one or more server computers, a domain name registration request comprising said domain name;

G) parsing, by said one or more server computers, said domain name text string into one or more keywords;

H) identifying, by said one or more server computers, one or more available domain names stored in a database communicatively coupled to said network, each of said one or more available domain names comprising said one or more keywords;

I) calculating, by said one or more server computers, an available domain name appraisal value for each of said one or more available domain names by:

i) increasing or decreasing said available domain name appraisal value responsive to one or more variances in a precision value, a popularity value, a presence value, a pattern value or a pay-per-click value assigned to each of said one or more available domain names;

ii) determining whether each of said one or more available domain names comprises a .com top level domain;

iii) calculating a revised available domain name appraisal value for each of said one or more available domain names according to the following formula: said revised available domain name appraisal value=(said available domain name appraisal value)*(said domain scarcity multiplier); and J) transmitting, by said one or more server computers, to said client computer, said revised available domain name appraisal value for each of said one or more domain names.

20. The method of claim 19, further comprising the step of determining, by said one or more server computers, whether an available domain name text string comprises one or more dashes and, responsive to a determination that said available domain name text string comprises said one or more dashes, calculating an available domain name dashes multiplier wherein said available domain name dashes multiplier is less than 1, wherein said revised available domain name appraisal value is calculated according to the following formula: said revised available domain name appraisal value=(said available domain name appraisal value)*(said domain scarcity multiplier)*(said available domain name dashes multiplier).

* * * * *